United States Patent
Ghosh et al.

[11] Patent Number: 5,309,568
[45] Date of Patent: May 3, 1994

[54] LOCAL BUS DESIGN

[75] Inventors: Subir Ghosh, Santa Clara; Fong-Lu Lin, San Jose, both of Calif.

[73] Assignee: OPTI, Inc., Santa Clara, Calif.

[21] Appl. No.: 851,444

[22] Filed: Mar. 16, 1992

[51] Int. Cl.⁵ .............................................. G06F 13/00
[52] U.S. Cl. ............................. 395/325; 364/DIG. 1; 364/240; 364/240.5; 364/243.5; 364/245.31; 364/245.6; 364/254.2; 364/260; 364/260.1
[58] Field of Search ............... 395/325, 250, 275, 425, 395/725

[56] References Cited

U.S. PATENT DOCUMENTS

| | | | |
|---|---|---|---|
| 4,040,026 | 8/1977 | Gernelle | 395/275 |
| 4,407,016 | 9/1983 | Bayliss et al. | 395/275 |
| 5,070,449 | 12/1991 | Dawson et al. | 395/325 |
| 5,079,692 | 1/1992 | Takeda | 395/275 |
| 5,088,028 | 2/1992 | Theus et al. | 395/325 |
| 5,097,410 | 3/1992 | Hester et al. | 395/275 |
| 5,123,092 | 6/1992 | Buxton et al. | 395/250 |
| 5,125,080 | 6/1992 | Pleva et al. | 395/325 |
| 5,175,826 | 12/1992 | Begun et al. | 395/325 |
| 5,182,808 | 1/1993 | Bagnoli et al. | 395/725 |
| 5,185,876 | 2/1993 | Nguyen et al. | 395/425 |

OTHER PUBLICATIONS

MicroDesign Resources, Inc., "PC Chip Sets" (1992), Chaps. 2 and 5, Appends. C and D.

Primary Examiner—Allen R. MacDonald
Assistant Examiner—Ayaz R. Sheikh
Attorney, Agent, or Firm—Fliesler, Dubb, Meyer & Lovejoy

[57] ABSTRACT

In an IBM PC AT-compatible computer architecture, CPU-generated addresses and data for accesses to a peripheral device in the I/O address space are coupled directly to the peripheral device from the local bus, without traversing the I/O bus. Any data returned from the peripheral device is coupled directly to the local bus, also without traversing the I/O bus. No buffers are needed for communicating such address and data information between the peripheral device and the I/O bus.

23 Claims, 7 Drawing Sheets

LOCAL BUS DESIGN

BACKGROUND

1. Field of the Invention

The invention relates to IBM PC AT-compatible computer architectures, and more particularly, to enhancements thereof for communicating with I/O peripheral devices.

2. Description of Related Art

The IBM PC AT computer architecture has become an industry standard architecture for personal computers and is typically built around a CPU such as an 80286, 80386SX, 80386DX, or 80486 microprocessor manufactured by Intel Corporation. The CPU is coupled to a local bus, capable of performing memory accesses and data transfers at high rates of speed (i.e., on the order of 10-50MHz with today s technology). The local bus includes 16 or 32 data lines, a plurality of address lines, and various control lines.

The typical IBM PC AT-compatible platform also includes DRAM main memory, and in many cases a timer, a real-time clock, and a cache memory, all coupled to the local bus.

The typical IBM PC AT-compatible computer also includes an I/O bus which is separate and distinct from the local bus. The I/O bus, sometimes referred to in these systems as an AT bus, an ISA bus or an EISA bus, is coupled to the local bus via certain interface circuitry. The I/O bus includes 8, 16 or 32 data lines, a plurality of I/O address lines, as well as control lines. The I/O address space is logically distinct from the memory address space and if the CPU desires to access an I/O address, it does so by executing a special I/O instruction. Such an I/O instruction generates memory access signals on the local bus, but also activates an MIO# signal to indicate that this is an access to the I/O address space. The MIO# line is often considered as merely another address line. The interface circuitry recognizes the I/O signals thereby generated by the CPU, performs the desired operation over the I/O bus, and if appropriate, returns results to the CPU over the local bus.

In practice, some I/O addresses may reside physically on the local bus and some memory addresses may reside physically on the I/O bus. The interface circuitry is responsible for recognizing that a memory or I/O address access must be emulated by an access to the other bus, and is responsible for doing such emulation. For example, a ROM (or EPROM) BIOS may be physically on the I/O bus, but actually form part of the local memory address space. During system boot, when the CPU sends out a non-I/O address which is physically within the ROM BIOS, the interface circuitry recognizes such, enables a buffer which couples the address onto the I/O bus, and activates the chip select for the ROM. The interface circuitry then assembles a data word of the size expected by the CPU, from the data returned by the ROM, and couples the word onto the local bus for receipt by the CPU. In many systems, at some point during the ROM-based boot-up procedure, the ROM BIOS is copied into equivalent locations in the DRAM main memory and thereafter accessed directly. The portion of DRAM main memory which receives such portions of the BIOS is sometimes referred to as "shadow RAM."

More specifically, in the standard architecture, the logical main memory address space is divided into a low memory range (0h-9FFFFh), a reserved memory range (A0000h-FFFFFh) and an extended memory range (100000h-FFFFFFh). In a typical system the system ROM BIOS is located logically at addresses F0000h-FFFFFh, and is located physically on the I/O bus. Addresses C0000h-EFFFFh contain ROM BIOS portions for specific add-on cards and are located physically on their respective cards on the I/O bus. Addresses A0000h-BFFFFh contain the video buffer, located physically on a video controller on the I/O bus. Duplicate memory space is typically provided in DRAM on the local bus for addresses C0000h-FFFFFh, and the user of the system can select during a setup procedure, which portions of the ROM BIOS are to be "shadowed" by being copied into the duplicate DRAM space during boot-up. Subsequent accesses to "shadowed" portions of the BIOS are to the DRAM copy, which is typically much faster than accesses to the ROM copy.

In addition to the above elements, a keyboard controller typically is also coupled to the I/O bus, as is a video display controller. A typical IBM PC AT-compatible system may also include a DMA controller which permits peripheral devices on the I/O bus to read or write directly to or from main memory, as well as an interrupt controller for transmitting interrupts from various add-on cards to the CPU. The add-on cards are cards which may be plugged into slot connectors coupled to the I/O bus to increase the capabilities of the system.

General information on the various forms of IBM PC AT-compatible computers can be found in IBM, "PC/AT Technical Reference Manual", in Sanchez, "IBM Microcomputers: A Programmer's Handbook" (McGraw-Hill: 1990) and Solari, "AT Bus Design" (San Diego: Annabooks, 1990). See also the various data books and data sheets published by Intel Corporation concerning the structure and use of the iAPX-86 family of microprocessors, including the "i486 Microprocessor Hardware Reference Manual", published by Intel Corporation, copyright date 1990, "386 SX Microprocessor", data sheet, published by Intel Corporation (1990), and "386 DX Microprocessor", data sheet, published by Intel Corporation (1990). All the above references are incorporated herein by reference.

The local bus includes a plurality of address lines and a plurality of data lines, as well as a number of control lines and power and ground. The exact set of lines which make up the local bus is well known in the industry, and may be determined from various sources, including the references cited above. For present purposes, it is sufficient to identify the following signal lines on the local bus ("#" indicates active low):

| | |
|---|---|
| CA(23:1) or CA(31:2) | Address lines. For the 80286 and 80386SX, 24 bits of address are provided. The high order 23 bits are provided on CA(23:1). For the 80386DX and 80486, 32 bits of address are available. The high order 30 bits are provided on CA(31:2). |
| BHE# & BLE# or BE#(3:0) | Byte High Enable and Byte Low Enable, or Byte Enables (3:0). For the 80286 and 80386SX, BLE# can be thought of as equivalent to CA(0) and BHE# = !BLE#. For the 80386DX and 80486, BE#(3:0) carries a 1-of-4 decode of the 2 |

| | |
|---|---|
| CD(15:0) or CD(31:0) | low order address bits Data lines. The 80286 and 80386SX operate with a 16-bit external data bus, and the 80386DX and 80486 operate with a 32-bit data bus. |
| M/IO# | Memory/IO control line. When asserted low by the CPU, indicates that the address on CA is an I/O address as opposed to a main memory address. |
| READY# | Acknowledgment to CPU that a current request has been serviced and CPU can start a new cycle. |
| CLK2 or CLK | CPU clock signal. |
| W/R# | Distinguishes write cycles from read cycles. |
| D/C# | Distinguishes data cycles, either memory or I/O, from control cycles which are: interrupt acknowledge, halt, and instruction fetching. |
| LOCK# | Indicates that other system bus masters are denied access to the system bus while it is active. |
| ADS# | Indicates that a valid bus cycle definition and address (W/R#, D/C#, M/IO#, BE0#, BE1#, BE2#, BE3# (or BHE# and BLE#) and CA) are being driven on the local bus. |
| NA# | Requests address pipelining. |
| BS16#(386) BS8#(486) | Allows direct connection of 16-bit and 8-bit data buses. |
| HOLD | Allows another bus master to request control of the local bus. |
| HLDA | Indicates that the CPU has surrendered control of its local bus to another bus master. |
| BUSY# | Signals a busy condition from a processor extension. |
| ERROR# | Signals an error condition from a processor extension. |
| PEREQ | Indicates that the processor extension has data to be transferred by the CPU. |
| INTR | A maskable input to CPU that signals the CPU to suspend execution of the current program and execute an interrupt acknowledge function. |
| NMI | A non-maskable input that signals the CPU to suspend execution of the current program and execute an interrupt acknowledge function. |
| RESET | Suspends any operation in progress and places the CPU in a known reset state. |

The various signals on the I/O bus are also well specified and well known in the industry. The Solari book identified above described the lines in detail. For present purposes, only the following signals are important:

| | |
|---|---|
| SA(19:0) | 20 address lines. Sufficient to address 1MB of memory. Only SA(15:0) are used to address the 64k I/O address space, and only SA(9:0) are used to address the basic 1k AT I/O address space. |
| LA(23:17) | Additional address lines for addressing a 16MB memory address space on the I/O bus. The LA lines are valid earlier in an I/O bus cycle, but must be latched if needed later in the cycle. The SA lines are not valid as early as the LA lines, but remain valid longer. |
| BALE | Bus address latch enable In line. In a CPU initiated I/0 bus cycle, this line indicates when the SA address, AEN and SBHE# lines are valid. In other I/0 bus cycles, the platform circuitry drives BALE high for the entire cycle. |
| SBHE# | System byte high enable. When SBHE# is active and SA(0) is low, then a 16-bit access will be performed. |
| AEN | When active, informs I/0 resources on I/O bus to ignore the address and I/O command signals. Used primarily in DMA cycles where only the I/O resource which has requested and received a DMA acknowledgment signal (DACK#) knows to ignore AEN and respond to the I/O signal lines. Some systems include slot-specific AEN signal lines. |
| SD(15:0) | 16 data lines. |
| MEMR#, SMEMR# | Read request lines to a memory resource on the I/O bus. SMEMR# is the same as MEMR# except that SMEMR# becomes active only when the read address is below 1MB (i.e., LA(23:20) = 0). |
| MEMW# SMEMW# | Write request lines to a memory resource on the I/O bus. SMEMW# becomes active only when the write address is below 1 MB. |
| IOR# | Read request line to an I/O resource on the I/O bus. |
| IOW# | Write request line to an I/O resource on the I/O bus. |
| MEMCS16# | Memory chip select 16. Asserted by an addressed memory resource on the I/O bus if the resource can support a 16-bit memory access cycle. |
| IOCS16# | I/O chip select 16. Asserted by an addressed I/O resource on the I/O bus if the resource can support a 16-bit I/O access cycle. |
| SRDY# | Synchronous Ready line. Also sometimes called OWS# or ENDXFR#. Activated by an addressed I/O resource to indicate that it can support a shorter-than-normal access cycle. |
| IOCHRDY | I/O channel ready line. If this line is deactivated by an addressed I/O resource, the cycle will not end until it is reactivated. A deactivated IOCHRDY supersedes an activated SRDY#. Also sometimes called CHRDY. |
| MASTER# | After requesting and receiving a DMA-acknowledged (DACK#) signal, an I/O bus add-on card can assert MASTER# to become the bus master. |
| REFRESH# | Activated by refresh controller to indicate a refresh cycle. |
| IRQ(15, 14, 12:9, 7:3) | Interrupt request lines to interrupt controller for CPU. |
| DRQ(7:5, 3:0) | DMA Request lines from I/O resource on I/O bus to platform DMA controller. |
| DACK(7:5, 3:0) | DMA Acknowledge lines. |
| TC | DMA terminal count signal. Indicates that all data has been transferred. |
| BCLK | I/O bus clock signal. 6-8.33 MHz square wave. |
| OSC | 14.318 MHz square wave. |

Recently, efforts have been made to reduce the size and improve the manufacturability of PC AT-compatible computers. Specifically, efforts have been made to minimize the number of integrated circuit chips required to build such a computer. Several manufacturers have developed "PC AT chipsets", which integrate a large amount of the I/O interface circuitry and other circuitry onto only a few chips. An example of such a chipset is the 386WB PC/AT chipset manufactured by OPTi, Inc., Santa Clara, Calif.

In the original IBM PC AT computer manufactured by IBM Corp., the I/O bus operated with a data rate of 8 MHz (BCLK=8 MHz) This was an appropriate data rate at that time since it was approximately equivalent to the highest data rates which the CPUs of that era could operate with on the local bus. Numerous third party vendors have since developed peripheral devices and controller cards which are intended to be plugged into an AT slot on the I/O bus, and which rely upon the 8 MHz maximum data rate. The AT standard also requires a wait state (i.e. 125 nS) for 16-bit data transfers, and four wait states (500 nS) for 8-bit data transfers. A zero wait state data transfer is also available, but only if the peripheral device signals, by activating the SRDY# control line on the I/O bus, that it can handle such fast data transfers.

In the years since the IBM PC AT was originally introduced, technology has improved dramatically to the point where local buses on typical high-end PC AT-compatible computers can operate on the order of 50 MHz. Despite these advances, however, such computers are still manufactured with an I/O bus operating at around 8 MHz because of the need to maintain compatibility with previously designed peripheral devices. These devices were designed in reliance upon the 8 MHz data rate and AT wait state protocol, and many such devices are not capable of operating faster. Even modern designs for AT bus peripherals often rely on the 8 MHz maximum data rate, even though very little additional effort or cost would be involved to design them to operate faster.

In addition to the large disparity between data transfer rates on the I/O bus as compared to the local bus in modern PC AT-compatible computers, the I/O interface circuitry needs to delay its handling of requests and responses from one bus to the other merely because the clocks are not synchronized. The circuitry therefore must hold a request or response until the appropriate clock edge on the destination bus appears. This can add on the order of 30-200 nS to each I/O bus cycle. Accordingly, it can be seen that any access to a peripheral device on the I/O bus imposes a substantial penalty on the performance of PC AT-compatible computers. This penalty will only become worse as the disparity between the local bus and I/O bus data rates continues to increase.

FIG. 1 depicts the important elements of a prior art PC AT-compatible computer architecture 10 which addressed the problem of the I/O bus access penalty with respect to one particularly speed-sensitive peripheral device, namely, a VGA video graphics controller 12. This particular computer system used an ET4000 VGA controller chip, manufactured by Tseng Labs, Newtown, Pa. The ET4000 is described in a data book entitled "ET4000 Graphics Controller High Performance Video Technology", published by Tseng Labs (1990), incorporated herein by reference. The VGA controller 12 shown in FIG. 1 includes this chip, the video memory, a DAC, and all associated circuitry. Although originally intended to be used in a standard configuration as a peripheral device on the I/O bus, the VGA controller 12 is nevertheless capable of operating at the high speeds of the local bus.

A VGA controller in the PC AT-compatible architecture is addressable in two address ranges: I/O ports are accessible at addresses 3B0-3DE in the I/O address space, and the video memory itself is accessible at addresses A0000-BFFFF in the main memory address space. In the original PC AT configuration, the VGA controller was located on the I/O bus and accesses to the I/O ports of the VGA controller occurred in the normal way for peripheral devices. That is, as mentioned above, the CPU issued an I/O read or write command and the I/O interface circuitry recognized it and generated the appropriate signals on the I/O bus in order to read or write from the addressed I/O port on the VGA controller. In order to access the video memory directly, the CPU issued an ordinary read or write cycle on the local bus as if the video memory was physically attached to the local bus. The I/O interface circuitry decoded the address to determine that it was within the address range of video memory, and then generated the appropriate signals on the I/O bus to execute the read or write cycle. When the cycle completed, any data returned by the VGA controller on the I/O bus was transmitted to the local bus. The READY# signal, which would have been asserted to the CPU almost immediately if the video memory was physically on the local bus, is withheld until the I/O cycle is complete.

In the architecture 10 shown in FIG. 1, accesses to the I/O ports of the VGA controller 12 continue to occur via the I/O bus. That is, the VGA controller 12 responds to the control signals on the I/O bus, receives its addressing from the I/O bus, and transfers data via the I/O bus. Similarly, master accesses to or from either port of the VGA controller, as well as DMA data transfers to or from video memory, also continue to occur via the I/O bus. Direct accesses by the CPU to or from video memory, however, occur directly from the local bus.

Referring to FIG. 1, the architecture 10 includes a CPU 20, which may be an Intel 80386SX microprocessor. Importantly, the CPU 10 has only a 16-bit external data bus and a 24-bit address bus. The CPU 20 is coupled to a local bus 22, together with a main memory array 24. The local bus 22 includes, among other things, 16 data lines CD(15:0), address lines CA(23:1) and BHE# and BLE#. For convenience, when referring to multiple CPU address lines herein, the BLE# line is sometimes referred to by its shorthand equivalent, CA(0).

The architecture 10 also includes an I/O bus 30 which includes, among other things, 16 data lines SD(15:0), address lines SA(19:0), and various control lines. Various peripheral devices illustrated as 32 and 34 in FIG. 1 are attached to the I/O bus 30. Such devices may include, for example, a local area network (LAN) card, an IDE disk drive controller, a modem, and so on.

The architecture 10 also includes an I/O interface chipset 40 which implements the I/O interface circuitry referred to above. On the local bus side, it is bi-directionally connected to the address lines CA(23:1), BHE# and BLE#, as well as the data lines CD(15:0). On the I/O bus side, the I/O interface chipset 40 is bi-directionally connected to the address lines SA(19:0) and data lines SD(15:0). The I/O interface chipset 40 includes an Appian System 90/SX chipset, manufactured by Appian Technology, Sunnyvale, Calif. The chipset 40 also includes an MCS1# input which can be activated by external circuitry to inhibit the performance of an I/O bus cycle in response to a local bus command which would otherwise be interpreted by the chipset 40 as requiring such an I/O bus cycle. It is believed that the MCS1# input was originally intended to be activated by a coprocessor which was present on the local bus instead of the I/O bus.

The VGA controller 12 includes, among other things, a partially multiplexed address/data port. On this port, pins DB(15:0) carry 16 data bits multiplexed with the low order 16 bits of an address, and pins A(19:16) carry four higher order address bits. These pins are connected to a dedicated VGA bus 44, different from both the local bus 22 and the I/O bus 30. As described in the above-mentioned Tseng Labs databook, the VGA controller 12 further includes the following signal lines for connecting to the remainder of the system:

| | | |
|---|---|---|
| CDMW# | Input | Memory Write signal for writing data to display memory. Typically connected to I/O bus MEMW# line. |
| ADMR# | Input | Memory Read signal for reading data from display memory or BIOS ROM. Typically connected to I/O bus MEMR# line. |
| MIOW# | Input | I/O Write signal for writing to VGA control registers. Typically connected to I/O bus IOW# line. |
| CIOR# | Input | I/O Read signal for reading from VGA control registers. Typically connected to I/O bus IOR# line. |
| WAIT# | Output | Memory or I/O read/write access should be stretched until this signal deactivates. Typically used to generate I/O bus READY line (i.e., IOCHRDY) |
| ADRE# | Output | Enables low order 16 address signals onto DB(15:0). Typically, controls buffers which enable the I/O bus address onto DB(15:0), but used differently in the FIG. 1 architecture as hereinafter described. |
| RDMH# | Output | Enables upper 8-bits of external bi-directional buffer coupling data lines with DB(15:8). Typically controls a buffer which enables coupling of DB(15:8) with the I/O bus data lines SD(15:8), but used differently in the FIG. 1 architecture as hereinafter described. |
| RDML# | Output | Enables low order 8-bits of external bi-directional buffer coupling data lines with DB(7:0). Typically controls a buffer ooupling DB(7:0) with the I/O bus data lines SD(7:0) but used differently in the FIG. architecture as hereinafter described. |
| DIR | Output | Signal for controlling the direction of bi-directional buffers coupling DB(15:0) with a data bus. 1 indicates a memory or I/O read from the VGA controller 12; 0 indicates a memory or I/O write to the VGA controller 12. |
| CS16# | Output | Identifies the VGA controller 12 as supporting 16-bit memory accesses. Typically connected to I/O bus MEMCS16# line. |
| IO16# | Output | Identifies the VGA controller 12 as supporting 16-bit I/O accesses. Typically connected to I/O bus IOCS16# line. |
| AEN# | Input | I/O address valid input Typically connected to I/O bus AEN# line. |
| SBHE# | Input | Together with SA(0), indicates whether 8- or 16-bit access is intended. Typically connected to receive I/O bus SBHE# line, but connected differently in the architecture of FIG. 1. |
| SFDB# | Output | 16-bit memory access enable. Same as CS16# but generated earlier. Not used in typical PC-AT compatible computer; used in FIG. 1 architecture to generate an early CS16# type signal which is used for video memory accesses during DMA and master cycles. |
| ROME# | Output | Enable signal for external video BIOS ROM. |

Octal 3-state buffers 50, 52 and 54 couple address lines from the local bus 22 onto the VGA bus 44. In particular, when enabled, buffer 50 couples local bus address lines CA(19:16) onto VGA bus lines A(19:16), buffer 52 couples local bus address lines CA(15:8) onto VGA bus lines DB(15:8), and buffer 54 couples local bus address lines CA(7:0) onto VGA bus lines DB(7:0).

Bi-directional buffers 56 and 58 can further couple data bi-directionally between the data lines of the local bus 22 and the corresponding lines of VGA bus 44. In particular, the local bus side of bi-directional buffer 56 is connected to local bus data lines CD(15:8), and the local bus side of buffer 58 is connected to local bus data lines CD(7:0). The VGA bus side of bi-directional buffer 56 is connected to VGA bus lines DB(15:8), and the VGA bus side of bi-directional buffer 58 is connected to VGA bus lines DB(7:0).

Additional octal buffers 60, 62 and 64 are provided to couple address lines from the I/O bus 30 onto the VGA bus 44. In particular, buffer 60, when activated, couples I/O bus address lines SA(19:16) onto VGA bus lines A(19:16), buffer 62 couples I/O bus address lines SA(15:8) onto VGA bus lines DB(15:8), and buffer 64 couples I/O bus address lines SA(7:0) onto to VGA bus lines DB(7:0). Two additional bi-directional octal buffers 66 and 68 are provided to couple data signals bi-directionally between the VGA bus 44 and the I/O bus 30. In particular, the I/O bus side of bi-directional buffer 66 is coupled to I/O bus data lines SD(15:8), and the I/O bus side of bi-directional buffer 68 is connected to I/O bus data lines SD(7:0). The VGA bus side of bi-directional buffer 66 is connected to VGA bus lines DB(15:8), and the VGA bus side of bi-directional buffer 68 is connected to VGA bus lines DB(7:0).

In a standard system, in which all addresses and data for VGA controller 12 are communicated via the I/O bus 30, buffers 50, 52, 54, 56, 58 and 60 are unnecessary and the Output Enables (OE#) for buffers 62, 64, 66 and 68 are driven by the VGA-generated ADRE#, ADRE#, RDMH# and RDML# signals respectively. In the architecture of FIG. 1, these output enables are driven instead by newly defined signals BADRE#, BADRE#, BRDMH# and BRDML# respectively. The output enables (OE#) for buffers 50, 52, 54, 56, 58 and 60 are connected to receive respective newly defined signals LOCAL#, LADRE#, LADRE#, LRDMH#, LRDML# and BUS#. The directional inputs to bi-directional buffers 56, 58, 66 and 68 are all connected to receive the DIR signal generated by the VGA controller 12, as would the equivalent of bi-directional buffers 66 and 68 in a standard architecture.

The OE# signals identified above for the above buffers are all generated by a group of three programmable logic devices and some additional random logic devices in response to the control signals generated by the VGA controller 12, and in response to various signals on the local and I/O buses 22 and 30. The MCS1 signal provided to I/O interface chipset 40 is also generated by such devices. A fourth PLD generates CS16#, substituting for that normally generated by VGA controller 12. All of these signals derive at least in part from a decode of the address lines on the local bus 22 which indicates whenever a local bus access is being performed to or from any address in the video memory address range A0000-BFFFF, and from a decode of I/O bus addresses to the VGA I/O port addresses.

In operation, buffers 60, 62, 64, 50, 52 and 54 are generally enabled to thereby place any address supplied by CPU 20 onto the VGA bus 44. Memory addresses to the video memory range A0000-BFFFF are supplied through buffers 50, 52 and 54 directly from the local bus 22, and all other memory and I/O addresses are supplied through buffers 60, 62 and 64 from the I/O bus 30. Addresses which do not appear on I/O bus 30, and which are not within the video memory address range, are not provided to the VGA bus 44. If an I/O bus cycle occurs which seeks to access any of the I/O ports on VGA controller 12, VGA controller 12 recognizes the I/O address on SA and, through the PLDs and other logic, controls the BADRE#, BRDMH#, BRDML# and DIR signals to respond as required to the I/O bus cycle. The VGA controller 12 is, during this time, essentially disconnected from the local bus 22. Master bus cycles and any DMA cycles which access the VGA I/O ports also occur in this manner. Similarly, if a local bus access occurs to an address outside the video memory address range, the VGA controller 12 remains essentially disconnected from the local bus 22.

If a local bus access occurs to or from an address which is within the video memory address range A0000-BFFFF, the PLDs and associated logic activate the MCS1# input to the I/O interface chipset 40. The chipset 40, which would otherwise have decoded the address, withheld the CPU's READY# signal, and initiated an access to the video memory on the I/O bus 30, is thereby inhibited from doing so. Instead, the OE# signals for the buffers shown in FIG. 1 are controlled to essentially couple the VGA bus 40 to the local bus 22 and to disconnect it from the I/O bus 30. This logic circuitry, in addition to the VGA controller 12, controls the operation of the buffers 50, 52, 54, 56 and 58 such that the VGA controller 12 responds to the video memory access as if it were physically present on the local bus 22. When the access is complete, one of the PLDs generates an MRDY1# signal to the chipset 40. The chipset 40 activates the READY# line to the CPU 20, and the VGA controller 12 returns to listening on the I/O bus 30.

If an access occurs to or from an address which is within the video BIOS address range, typically C0000h-C8000h, the chipset 40 recognizes this and may initiate a standard AT cycle on the I/O bus 30 for accessing the video BIOS ROM. In a standard architecture, where the VGA controller is physically on the I/O bus, the VGA controller decodes the address on the I/O bus itself in order to generate a ROME# ROM enable signal for the video BIOS ROM. This procedure continues to be used in the architecture of FIG. 1 since, as explained above, the video ROM BIOS addresses which appear on I/O bus 30 will be passed to the VGA controller 12 via buffers 60, 62 and 64.

The FIG. 1 architecture operates, as mentioned above, only with an 80386SX (or lesser) CPU, which has only a 24-bit address bus and 16-bit data bus. The technique incurs a problem when an attempt is made to extend the concept for use with a CPU and local bus which has 32 data lines instead of 16. This is the trend in the personal computer market today, with the advent of such 32-bit external data bus microprocessors as the Intel 80386DX and 80486. These microprocessors also have a 32-bit address bus. The natural extension of the FIG. 1 technique would therefore require adding two more bi-directional buffers similar to 56 and 58 to accommodate the additional data lines and one additional uni-directional buffer similar to 50, 52 or 54 to accommodate the additional address lines. Counting these buffers, the natural extension of the FIG. architecture for a 32-bit external data bus microprocessor therefore requires a total of 13 buffer chips. In addition, further programmable logic and other random logic control circuitry may also be required. Such a large number of chips in an industry moving toward reducing the number of chips required to implement a computer, may in effect prohibit the use of the FIG. 1 technique on newer computers.

SUMMARY OF THE INVENTION

In accordance with the invention, a video controller such as a VGA controller is coupled to perform all its accesses over the local bus. Peripheral interface circuitry is provided for detecting any access on the local bus to the video controller, including accesses to an I/O port on the video controller. When an access to an I/O port on the video controller is detected, the peripheral interface circuitry couples the I/O address from the local bus to the video controller directly. Data is also coupled directly between the local bus and the video controller. That is, whereas the video controller continues to receive its control signals over the I/O bus, the I/O address and all data are transmitted via the local bus directly. Such a system can be implemented using only 6 or 7 buffer chips for a 32-bit system, far fewer than the 13 required using the natural extension of the FIG. 1 technique.

BRIEF DESCRIPTION OF THE DRAWINGS

The invention will be described with respect to particular embodiments thereof, and reference will be made to the drawings, in which.

DETAILED DESCRIPTION

Figure 1:
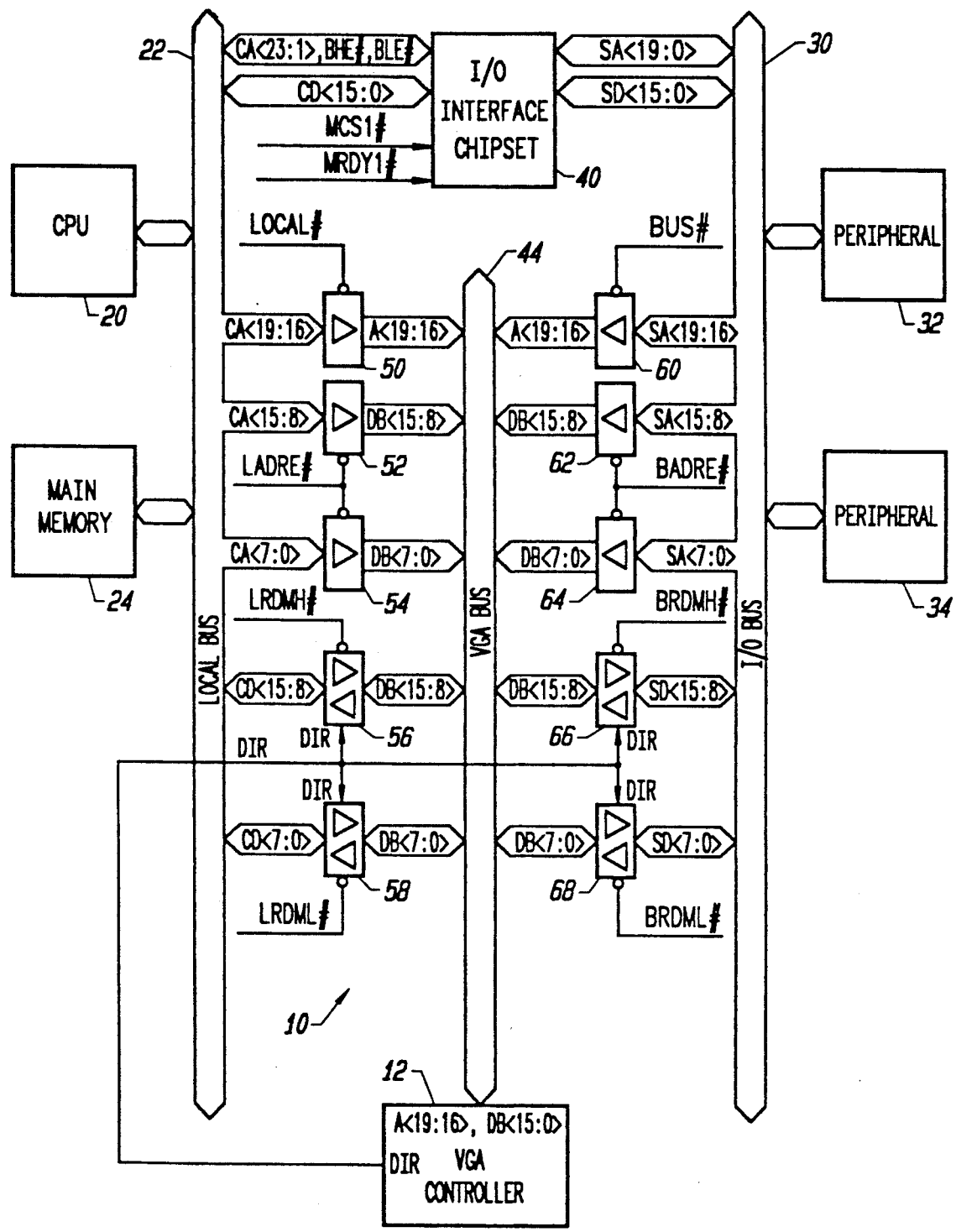
FIG. 1 is a functional block diagram of a prior art personal computer system architecture.
Figure 2:
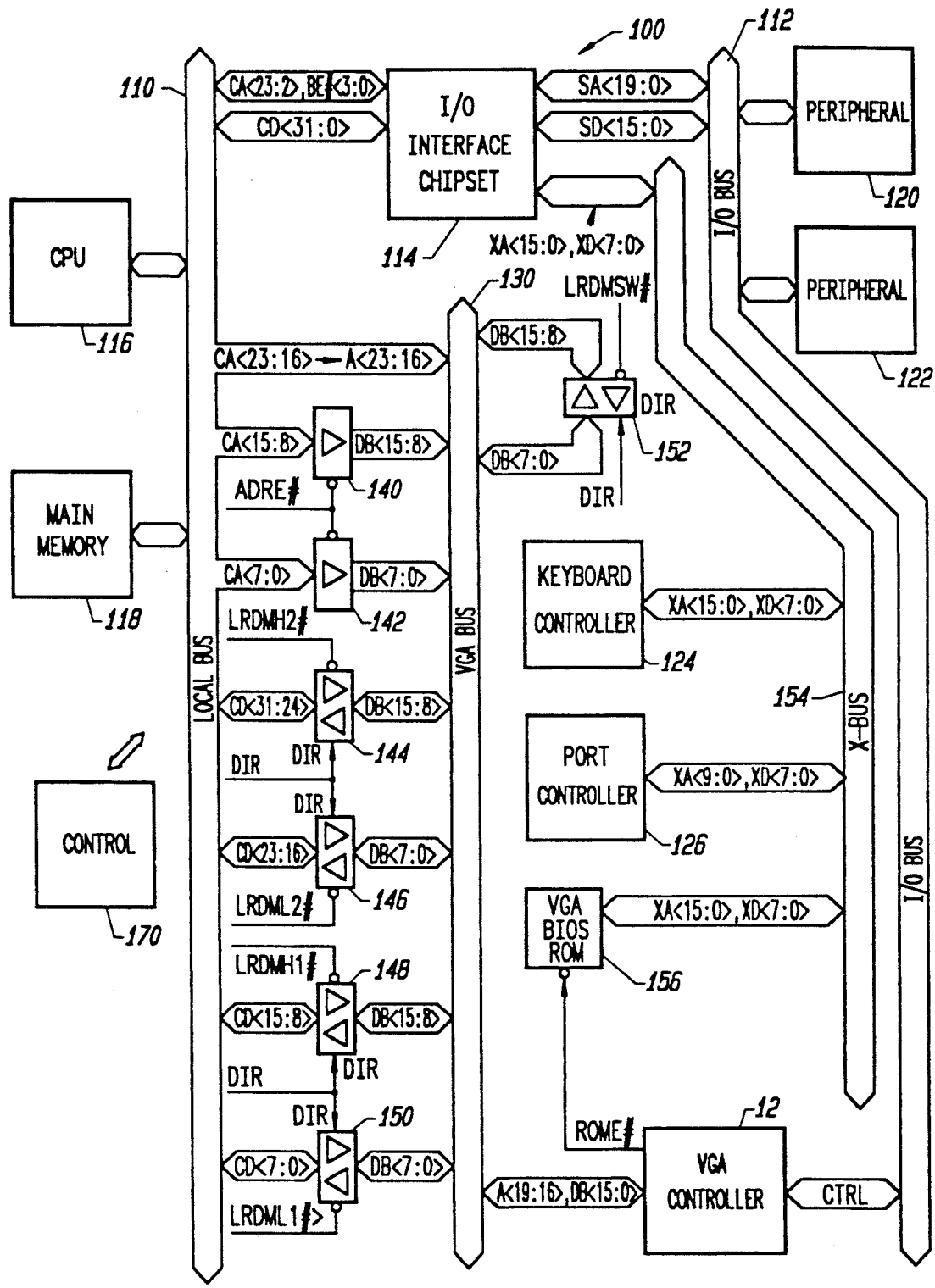
FIG. 2 is a functional block diagram of a personal computer system architecture which may incorporate the invention.

FIG. 2 shows a functional block diagram of significant components of one type of a PC AT-compatible computer system architecture 100 according to the invention. The embodiment of FIG. 2 is based on an Intel 80486 CPU, but the invention can also be used with an Intel 80386DX CPU. The architecture 100 includes a local bus 110, an I/O bus 112, an I/O interface chipset 114 coupled between the local bus 110 and the I/O bus 112, and a VGA controller 12. The interface chipset 114 may include an 82C491, 82C493 and 82C206 available from Opti, Inc., and the VGA controller may be the same ET-4000 device as in the architecture of FIG. 1. Two local bus devices, namely a CPU 116 and an up-to 64 MB main memory array 118, are coupled to the local bus 110, and various peripheral devices 120 and 122 are coupled to the I/O bus 112. The architecture 100 also includes an X-bus 154, which is used primarily for 8-bit devices such as a keyboard controller 124 and a port controller 126. The X-bus is coupled to the I/O interface chipset 114, and contains 16 address lines XA(15:0) and 8 data lines XD(7:0), as well as control lines. The X-bus 154 is also coupled to VGA BIOS ROM 156, the output enable input of which is coupled to receive a ROME# signal from the VGA controller 12.

Unlike the CPU 20 in FIG. 1, the CPU 116 in FIG. 2 is an Intel 80486, which has a 32-bit external data bus and a 32-bit address bus. The local bus 110 therefore includes 32 data lines CD(31:0), 30 high order address lines CA(31:2) and four Byte Enable lines BE#(3:0). The I/O bus 112, on the other hand, is similar to the I/O bus 30 in FIG. 1 and includes the control signal lines described above.

The architecture 100 further includes a VGA bus 130 which is similar to the VGA bus 44 in FIG. 1 in that it includes 16 data lines multiplexed with 16 low order address lines. The VGA bus 130 further includes 8 additional dedicated high order address lines. The VGA controller 12 is connected to the VGA bus in the same manner as it was connected to the VGA bus 44 in FIG. 1. Other peripheral devices addressable in the I/O address space, such as a SCSI bus controller, can also be connected to the VGA bus 130, but for the pu pose of the present discussion, it will be sufficient to describe an embodiment in which VGA controller 12 is the only such device.

The high-order 8 address lines of the VGA bus 130, A(23:16), are connected directly to receive address lines CA(23:16) from the local bus 110. No buffering is required. The next 8 local bus address bits CA(15:8) are coupled via a 3-state buffer 140 to VGA bus lines DB(15:8), and the low-order local bus address lines CA(7:0) (with a CA(1:0) encoded from BE# (3:0)) are coupled via 3-state buffer 142 to VGA bus lines DB(7:0). High-order local bus data lines CD(31:24) are coupled bi-directionally with VGA bus lines DB(15:8) via bi-directional 3-state buffer 144, and local bus data lines CD(23:16) are coupled bi-directionally with VGA bus lines DB(7:0) via bi-directional 3-state buffer 146. Similarly, local bus data lines CD(15:8) are coupled bi-directionally with VGA bus lines DB(15:8) via bi-directional 3-state buffer 148, and local bus data lines CD(7:0) are coupled with VGA bus lines DB(7:0) via bi-directional 3-state buffer 150 In addition to these buffers, an additional bi-directional 3-state buffer 152 is coupled between VGA bus lines DB(15:8) and DB(7:0) for performing byte swapping. Importantly, no path is provided for coupling data or addresses directly between the VGA bus 130 and the I/O bus 112. The unidirectional buffers 140 and 142 may be 74F244s and the bi-directional buffers 144, 146, 148, 150 and 152 may be 74F245s.

Three-state buffers 140 and 142 each include an OE#, and both are connected to receive an ADRE# signal. Bi-directional buffers 144, 146, 148 and 150 also each include an OE# input, and they are connected respectively to receive LRDMH2#, LRDML2#, LRDMH1# and LRDML1# signals. Buffers 144, 146, 148 and 150 also each include a DIR input, all of which are connected to receive a DIR signal. Bi-directional buffer 152 also has an OE# input, which is connected to receive an LRDMSW# signal, and a DIR input, also coupled to receive the DIR signal.

The DIR signal is generated by VGA controller 12 and is the same DIR signal as described above. The ADRE# signal, too, is generated by VGA controller 12 and is the same ADRE# signal as described above. If other peripherals such as 124 or 126 are included on the VGA bus, then the DIR and ADRE# signals would have to be generated by combining signals from each of those devices. The LRDML1#, LRDMH1#, LRDML2#, LRDMH2# and LRDMSW# signals are all generated by control circuitry 170 according to the following logic formulas:

!LRDMH2# = ROME# & !BE3# & BE1# & (!RDMH# + !RDML# BE2# + !RDML# & !BE2# & LOCAL# & CA0);

!LRDMH1# = ROME# & !BE1# & (!RDMH# + !RDML# & BE0# + !RDML# & !BE0# & LOCAL# & CA0);

!LRDML2# = ROME# & !RDML# & !BE2# & (BE1# & BE0# & !LOCAL# + BE0# & LOCAL# & !CA0 + BE0# & !BE3# & LOCAL# & CA0 & !BS8#);

!LRDML1# = ROME# & !BE0# & !RDML# & (!LOCAL# + LOCAL# & !CA0 + LOCAL# & CA0 & !BE1# & BS8#);

!LRDMSW# = ROME# & RDMH# & !RDML# & (!BE1# & BE0# + !BE3# & BE2# & BE1# & BE0# + LOCAL# & !BE1# & CA0 + LOCAL# & !BE3# & CA0).

where:

ROME is the complement of the ROME#signal generated by VGA controller 12 to indicate a memory access to external VGA ROM BIOS, BE#(3:0) are the Byte Enable lines on the local bus, RDMH# and RDML# are generated by VGA controller 12 to enable coupling between the DB lines of the VGA controller 12 and respectively the high and low bytes of an external data bus, and CA0 is generated by interface circuitry 114 from a decode of the BE#(1:0) lines.

As used herein, '#' indicates an active low signal, '!' is the NOT operator '&' is the AND operator, and '+' is the OR operator. '!' occurs before '&' which occurs before '+'.

The LOCAL signal referred to in these formulas, roughly speaking, is active for CPU accesses to an address which is in the video memory address range. It is generated by the control circuitry 170 according to the following formula:

!LOCAL# =  !CA31 & !CA28 & !CA27 & !CA26 & !CA25
         & !CA24 & !CA23 & !CA22 & !CA21 &
         !CA20 & CA19 & !CA18 & CA17 & LM/IO#
         & D/C# & !HLDA & SFDB#.

where

CA(31, 28:17) are address lines on the local bus,

LM/IO# is the Memory/IO control line on the local bus (0=I/O cycle, 1=memory cycle), D/C# is the data/control signal on the local bus (1=data cycle, 0=control cycle), HLDA is the Hold Acknowledge signal on the local bus, and SFDB# is the early 16-bit memory access enable generated by VGA controller 12.

The BS8# signal referred to above is generated only during I/O read accesses to the controller and indicates that the controller supports 8-bit accesses only. It is generated by the control circuitry 170 according to the following equation:

!BS8#=!RDML# & !LM/IO# & !W/R#, where W/R# is the local bus W/R# signal.

Control circuitry 170 also generates a VA0 and a VA signal for the VGA bus 130, according to the following formulas:

!VA1 = !BE1# + !BE0#

!VA0 = !LOCAL# & ( !BE0# + !BE2# & BE1# )
     + LOCAL# & !CA0 & ( !BE0# + !BE2# & BE1# )
     + LOCAL# & CA0 & !BS8# & ( !BE0# + !BE2# &
     BE1# )

Figure 3:
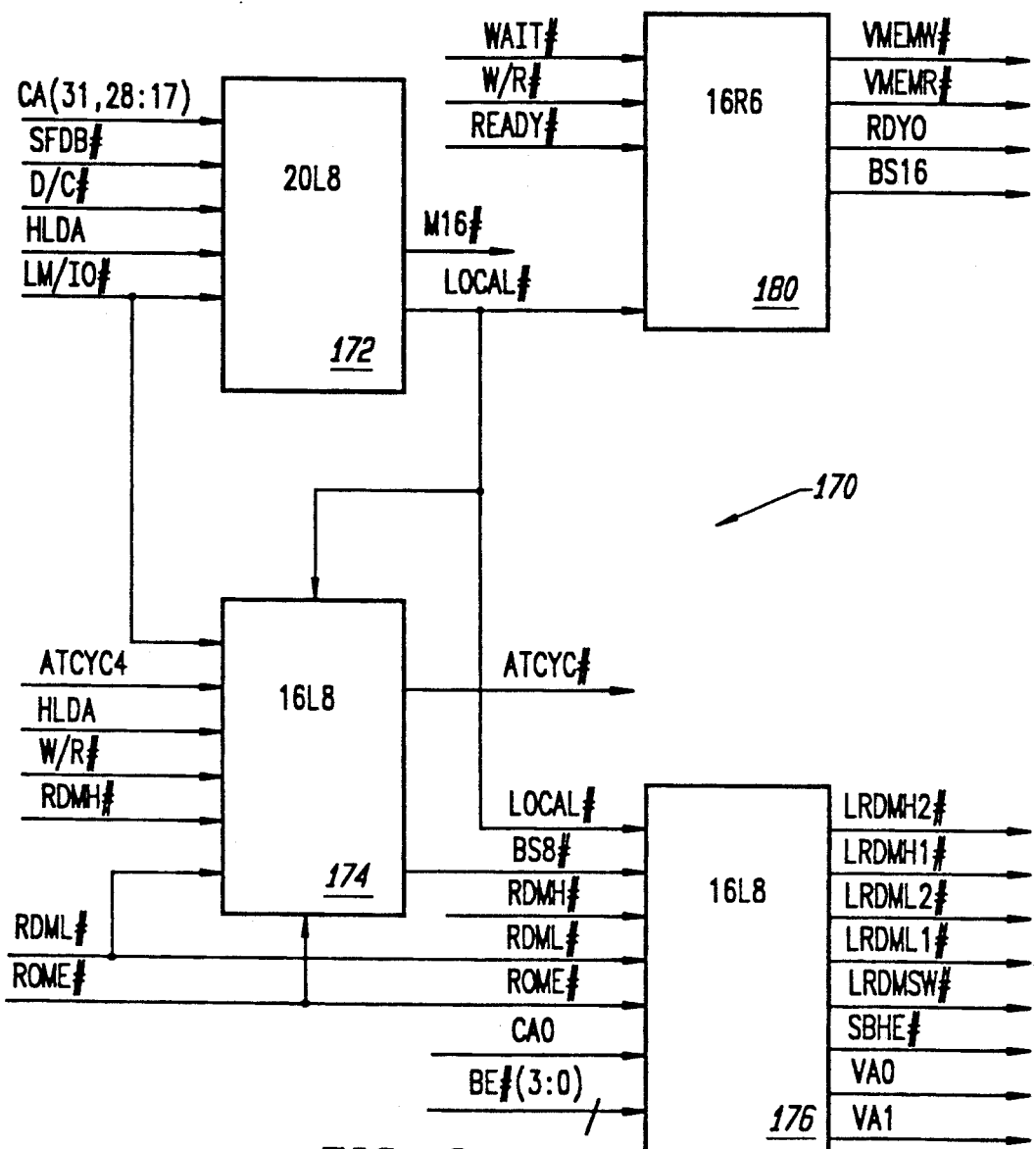
FIG. 3 is a detail of control circuitry 170 in FIG. 2.

FIG. 3 shows three programmable logic devices (PLDs) used by control circuitry 170 to generate the enable signals for the buffers of FIG. 2. As shown in FIG. 3, these devices include one 20L8 172 and two 16L8s 174 and 176. These PLDs generate various signals, but only those inputs and outputs pertinent to an understanding of the invention are shown. In particular, PLD 172 receives CA(31, 28:17), SFDB#, D/C#, HLDA, and LM/IO# from the local bus. PLD 172 generates, among other things, the LOCAL# signal used as described above. PLD 172 also generates an M16# signal which is active low or Hi-Z and is enabled according to the formula:

enable M16 =  !CA31 & !CA28 & !CA27 & !CA26 & !CA25
             & !CA24 & !CA23 & !CA22 & !CA21 &
             !CA20 & CA19 & !CA18 & CA17 & LOCAL#
             & SFDB#.

PLD 174 receives the LM/IO#, HLDA and W/R# signals from the local bus, ROME#, RDMH# and RDML# from the VGA controller 12, and an ATCYC4 signal from the chipset 114. The chipset-generated ATCYC4 signal indicates generally that an AT bus cycle is requested. PLD 174 generates BS8# as described above. PLD 174 also generates an ATCYC signal from the formula:

ACTYC = ATCYC4 + LOCAL# & !ACTYC1# + ACTYC2 where

!ATCYC1# = !W/R# & !RDMH# & ROME#
         + !W/R# & !RDML# & ROME#

ATCYC2   = HLDA & !RDMH#
         + HLDA & !RDML#.

The PLD 176 receives the LOCAL# signal, the BS8# signal and the RDML# signal as inputs. It also receives RDMH#, RMOE#, CA0, and BE#(3:0). The PLD 176 generates the five output enable signals for the bi-directional buffers 144, 146, 148, 150 and 152 as described above, as well as SBHE#, VA0 and VA1.

Each of the programmable logic devices 172, 174 and 176 may also generate additional signals for use for other purposes in the system, not relevant to the invention.

The control circuitry 170 also includes a 16R6 PLD 180 which is connected as a 4-state state machine to generate the following signals

| | |
|---|---|
| VMEMW# | Connected to CDMW# line of VGA controller 12. Provides timing for a write access to VGA display memory. |
| VMEMR# | connected to ADMR# line of VGA controller 12. Provides timing for a read access to VGA display memory. |
| RDYO# (or VRDYI#) | ANDed with a WRDYI# signal from an optional coprocessor and provided to chipset 114 to indicate the end of a local bus cycle |
| BS16# | Connected to BS16# line of local bus to indicate to CPU 116 that VGA bus has 16, not 32, data lines. |

The states are defined using state bits [Q1,Q0], and the state transitions are defined as follows:

| State | Transition |
|---|---|
| 1 1 | if !ADS# then 1 0 else 1 1 |
| 1 0 | if !LOCAL# then 0 0 else 1 1 |
| 0 0 | goto 0 1 |
| 0 1 | goto 1 1 |

From the above states, the PLD 180 generates its output signals according to the following formulas:

!VMEMW# =   Q1# & Q0# & !ADS# & W/R# & !WAITSEL#
            + Q1# & !Q0# & !LOCAL# & W/R#
            + !VMEMW# & !LOCAL# & RDYO

!VMEMR# =   Q1# & Q0# & !ADS# & !W/R# & !WAITSEL#
            + Q1# & !Q0# & !LOCAL# & !W/R#
            + !VMEMR# & !LOCAL# & RDY

!RDYO# =    !Q1# & !Q0# & WAIT# & !LOCAL# & RDYO# &
            RDY# & !WAITSEL#
            + Q1# & Q0# & LWAIT# & !LOCAL# & RDYO#
            & RDY# & (!VMEMR# + !VMEMW#)

!BS16# =    !LOCAL# & RDY# & (!VMEMR# + !VMEMW#)

!LWAIT# =   !WAIT#

In these formulas, LWAIT is a synchronous version of the WAIT signal generated by VGA controller 12 and RDY# is the local bus READY# line. WAITSEL is a jumper-selected signal for choosing between 3 and 5 wait state operation. VMEMW# and VMEMR# are fast versions of the standard I/O bus MEMW# and MEMR# signals, indicating a write or read request to a memory resource (such as VGA controller 12) on the I/O bus. VMEMW# and VMEMR# are synchronized to the high speed local bus clock, whereas MEMW# and MEMR# are synchronized to the 8 MHz I/O bus clock.

In accordance with the above, the significant control lines of VGA controller 12 are connected as follows:

| | |
|---|---|
| CDMW# | Conected to the VMEMW# output of control circuitry 170. |
| ADMR# | Connected to the VMEMR# output of control circuitry 170. |
| MIOW# | Connected to I/O bus IOW# line (conventionally). |
| CIOR# | Connected to I/O bus IOR# line (conventionally). |
| WAIT# | Connected to an input to control circuitry 170, which activates the I/O bus CHRDY line if WAIT# is inactive either during an access to the VGA I/O ports, or during a DMA or MASTER access to video memory. Also used by control circuitry 170 in the generation of timing signals VMEMW#, RDYO#, and BS16#. |
| ADRE# | Connected to enable input of buffers 140 and 142 to enable the low order 16 local address signals onto DB(15:0). In the conventional design this signal enabled the I/O address signals onto DB(15:0), and in the FIG. 1 architecture this signal enabled selectably the local bus address signals or the I/O bus address signals onto DB(15:0). |
| RDMH# | Used by control circuitry 170 to generate |
| RDML# | the LRDML1#, LRDML2#, LRDMH1#, LRDMH2# and LRDMSW# signals (FIG. 2), which control the coupling between the local bus data lines and DB(15:0). In the conventional architecture RDMH# and RDML# controlled the coupling between the I/O bus data lines and DB(15:0), and in the FIG. 1 architecture they controlled the coupling between selectably the local bus data lines or the I/O bus data lines, and DB(15:0). |
| DIR | Connected to bi-directional buffers 144, 146, 148 and 150 (FIG. 2) to control the direction of data transfer between the local bus and DB(15:0). Controlled the direction of data transfer between the I/O bus and DB(15:0) in the conventional architecture, and between either the local bus or the I/O bus and DB(15:0) in the FIG. 1 architecture. |
| CS16# | Connected to receive the M16# signal generated by control circuitry 170 and connected to I/O bus MEMCS16# line. |
| IO16# | Connected to the I/O bus IOCS16# line. |
| AEN# | Connected to always indicate to the VGA controller 12 that the I/O address is valid, except in circumstances not here relevant. |
| SBHE# | Generated by control circuitry 170 from the local bus address according to the formula !BE3# + !BE1#. |
| SFDB# | Used by control circuitry 170 to generate the LOCAL# and M16# enable signals. |
| ROME# | Connected to enable external video BIOS ROM 156 (FIG. 2). |

When used in a conventional system, in addition to I/O accesses, the chipset 114 itself decodes accesses to memory addresses which are physically on the I/O bus (such as video memory addresses A0000 BFFFF) and automatically generates an I/O bus cycle to accomplish the read or write. To do this, the system controller (82C491 or 82C493) chip in the chipset 114 activates an ATCYC# signal which it provides to a data bus controller (82C392) chip in the chipset 114. The data bus controller chip responds by transmitting data from the local bus to the I/O bus if the access is a write access, or from the I/O bus to the local bus if the access is a read access. The system controller chip also includes an LDEV# input which, when activated, will inhibit an I/O cycle which the system controller chip would otherwise have generated. LDEV# is typically used by a coprocessor located physically on the local bus.

Figure 8:
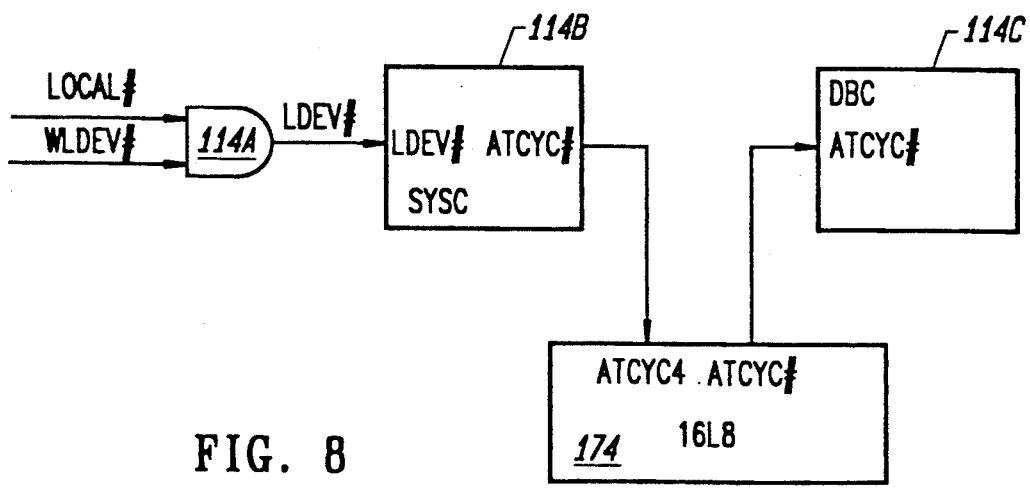
FIG. 8 is a diagram illustrating portions of the chipset and the control unit shown in FIG. 2.

In the architecture of FIG. 2, however, substitute signals are generated for both LDEV# and ATCYC#. As shown in FIG. 8, the coprocessor LDEV# signal, identified in FIG. 8 as WLDEV#, is ANDed with the LOCAL# signal generated by PLD 172 (FIG. 3) by an AND gate 114A, to generate a substitute signal provided to the LDEV# input of system controller chip 114B. Similarly, the ATCYC# output of system controller 114B is provided to the ATCYC4 input of PLD 174 (FIG. 3), which generates the substitute ATCYC# signal as described above and provides it to the ATCYC# input of data bus controller 114C (FIG. 8).

In an access to video memory in the architecture of FIG. 2, PLD 172 (FIG. 3) decodes the address and activates the LOCAL# signal. This in turn activates the LDEV# signal (FIG. 8), which inhibits the I/O cycle which otherwise would have been generated by system controller 114B. The ATCYC# output of the system controller 114B also remains inactive, as does the substitute ATCYC# output of PLD 174. Accordingly, the data bus controller 114C does not transmit any data through itself, between the local bus 110 and the I/O bus 112 in response to the video memory access. Instead, data and addresses are coupled directly between the local bus 110 and the VGA bus 130 via buffers 140, 142, 144, 146, 148 and 150 (FIG. 2) as previously described. (For DMA and Master accesses to video memory, the ATCYC# signal generated by PLD 174 controls the proper direction of transfer.)

In an access to the I/O ports of VGA controller 12, LDEV# is not activated and the system controller 114B does activate its ATCYC# output. If the access is a write access, the data bus controller 114C transmits the data superfluously from the local bus 110 to the I/0 bus 112 in addition to the coupling from the local bus 110 directly to the VGA bus 130 as previously described. On a read access, however, the PLD 174 does not activate its ATCYC# output and thereby prevents the data bus controller 114C from transmitting data from the I/O bus 112 to the local bus 110. Only the data coupled by buffers 144, 146, 148 and 150 is driven onto the local bus 110 as previously described.

Figure 4:
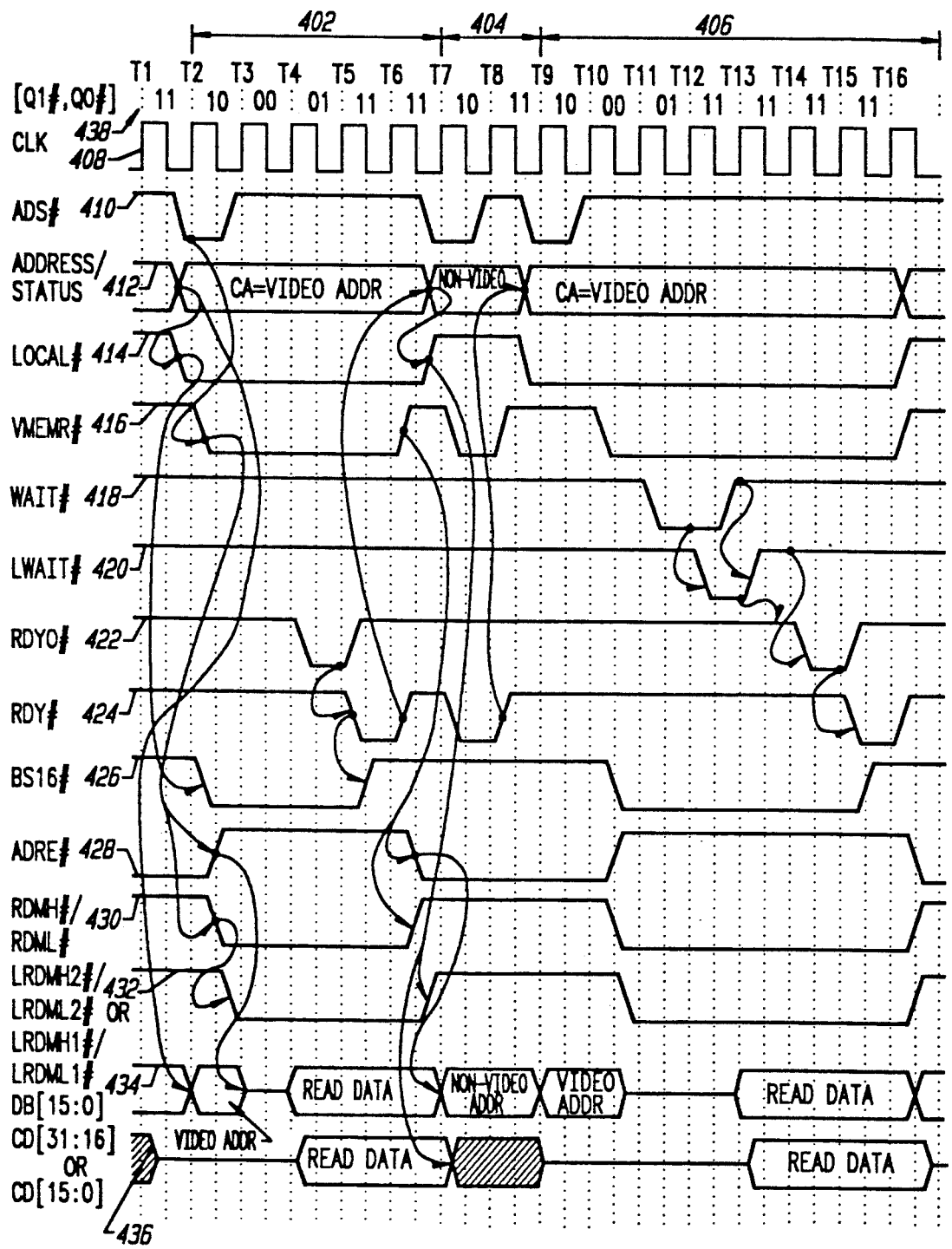
FIG. 4 is a timing diagram showing the operation of the apparatus of FIG. 2 for performing a read access to video memory.

FIG. 4 is a timing diagram showing the operation of the architecture 100 for a CPU read access to video memory in the VGA controller 12. FIG. 4 shows three separate memory accesses, namely, a 3 wait state video memory read cycle 402, a non-local device cycle 404 which is not to an address in video memory, and a standard 5 wait state video memory read cycle 406.

As previously explained, 3-wait state video memory read cycles take place when WAITSEL is set by jumper to 0, and 5-wait state video memory read cycles occur when WAITSEL is set by jumper to 1. The sequence of cycles shown in FIG. 4 is therefore somewhat hypothetical since the jumper position of WAITSEL would have to have been changed before cycle 406. The non-local device cycle 404 assumes WAITSEL=0. Identified by a waveform 408 is the local bus clock signal CLK. For convenience, each rising edge of the waveform 408 is given a time designation T1-T6. The waveform 410 shows the ADS# signal generated by CPU 116, and the waveform 412 shows changes in the address/status lines of the local bus. This includes CA(31:2), BE#(3:0), D/C#, W/R#, M/IO# and HLDA. Waveform 414 shows the LOCAL# signal generated by PLD 172 (FIG. 3), and waveform 416 shows the VMEMR# signal generated by PLD 180. The WAIT# signal generated by VGA controller 12 is shown as waveform 418, and the LWAIT# signal generated and used internally by PLD 180 in response to the WAIT# signal is shown as waveform 420. The RDYO# signal generated by PLD 180 to indicate the end of a local bus cycle is shown as waveform 422, and the RDY# signal generated by chipset 114 to indicate to the CPU 116 that the cycle is complete, is waveform 424. Waveform 426 shows the BS16# signal generated by PLD 180 to indicate to the CPU 116 that the VGA bus has 16, not 32, data lines. Waveform 428 shows the ADRE# signal generated by VGA controller 12 to enable the low order 16 local address lines onto DB(15:0) of the VGA bus 130, and waveform 430 shows the RDMH#/RDML# signal generated by VGA controller 12 to enable coupling of respectively the high or low order 8 bits of the DB lines on VGA bus 130. RDMH# and RDML# will be simultaneous since the VGA controller 12 is configured for 16-bit rather than 8-bit, memory accesses. Waveform 432 shows either LRDMH2#/LRDML2# or LRDMH1#/LRDML1#, depending on the address, generated by PLD 176 in response to the RDMH#/RDML# signals. Finally, waveform 434 shows the information present on DB(15:0) of VGA bus 130, and waveform 436 shows when the data read from the video memory is present on the local bus CD(31:16) or CD(15:0) data lines. Line 438 in FIG. 4 indicates the state Q1#, Q0# of the state machine in PLD 180 after each rising edge of the clock signal 408.

As shown in FIG. 4, at time T1, all the control signals are in their inactive state except ADRE#. Accordingly, VGA controller 12 and control unit 170 do not at this time affect the operation of other parts of the system, but merely listen to the address lines on local bus 110. The state machine in PLD 180 is in its rest state of 1 1.

Sometime prior to T2, it is assumed that the CPU 116 places valid video address and status information on the address/status lines as shown in waveform 412. This includes CA=0A0000h-0BFFFFh, D/C#=1, W/R#=0, M/IO#=1, and HLDA=0. The CPU 116 then activates the ADS# signal as shown in waveform 410, to start a video memory read cycle. As shown in waveform 414, the valid video memory address and status information causes the PLD 172 to activate its LOCAL# output, which in turn causes PLD 180 to activate its BS16# signal for the CPU 116. The low order 16 video address bits from CA(15:0) are also coupled onto DB(15:0) on VGA bus 130 via buffers 140 and 142 (FIG. 2), as shown in waveform 434, CA(23:16) being connected directly to the high order 8 address lines on the VGA bus 130 as shown in FIG. 2.

At time T2, since ADS# is active (low), the PLD 180 state machine changes to state 1 0. Since WAITSEL=0, PLD 180 also activates VMEMR# at time T2 as shown in waveform 416. This occurs regardless of whether LOCAL# is active, but as will be seen in relation to the nonlocal access cycle 404, VMEMR# will return high at time T3 if LOCAL# is not active. Activation of VMEMR# in turn causes ADRE# to deactivate and RDMH#/RDML# to activate, which in turn causes PLD 176 to activate LRDMH2#/LRDML2# or LRDMH1#/LRDML1#, as shown in waveforms 428, 430 and 432. Removal of ADRE# causes the buffers 140 and 142 (FIG. 2) to stop driving the video address onto DB(15:0), as shown in waveform 434, making DB(15:0) available to carry the data read from video memory. Activation of LRDMH2#/LRDML2# or LRDMH1#/LRDML1# couples any data on DB(15:0) onto either CD(31:16) or CD(15:0), via buffers 144/146 or 148/150, respectively.

Prior to time T3, CPU 116 deactivates ADS#. At time T3, the state machine in PLD 180 changes to state 00 and at time T4, it changes to state 0 1. By time T5, the data from the video memory is expected to be present on DB(15:0) and coupled to the local bus data lines as shown in waveforms 434 and 436. Accordingly, at time T4, in response to the PLD 180 state machine being at state 0 0 just prior to the rising edge of CLK, PLD 180 activates the RDYO# signal as shown in waveform 422 to prepare to end the cycle.

At time T5, in response to RDYO# being low, chipset 114 activates the RDY# signal to indicate to CPU 116 that the video memory read request has now been serviced and valid data is on the local bus CD lines. Activation of the RDY# signal also causes PLD 180 to deactivate the BS16# signal as shown in waveform 426.

At time T6, the state machine in PLD 180 remains at 1 1. Chipset 114 also deactivates the RDY# signal, and PLD 180 deactivates the VMEMR#. The deactivation of VMEMR# causes VGA controller 12 to deactivate RDMH#/RDML# as shown in waveform 430, and to activate ADRE# as shown in waveform 428. As a result, buffers 140 and 142 turn on to couple future address bits from the local bus 110 onto the VGA bus DB(15:0) lines as shown in waveform 434. Deactivation of RDY# also causes the CPU 116 to place the next address on the address/status lines which, as shown in waveform 412 is assumed to be a nonvideo memory address. In fact, it is assumed to be a cache read cycle.

The CPU 116 also initiates the cycle by activating ADS# as shown in waveform 410. Since the new address is a non-local address, PLD 172 deactivates the LOCAL# signal as shown in waveform 414, which in turn deactivates all the LRDM_ signals shown in waveform 432. This turns off buffers 144, 146, 148 and 150 so that the cache memory can drive the data lines of local bus 110 as shown in waveform 436.

Since cycle 404 is a cache read cycle, it is complete in two clock cycles. Accordingly, the chipset 114 activates the RDY# line for the CPU 116 in response to T7 (and independently of RDYO#), and deactivates it in response to T8. The PLD 180 activates VMEMR# during cycle 404, but it is ignored by the remainder of the logic. Additionally, the non-video address appears on DB(15:0) as shown in waveform 434, but has no effect there since it is not recognized by the VGA controller 12 or control unit 170.

Upon completion of cycle 404, the CPU 116 is assumed to place another video address on the local bus 110 CA lines along with appropriate status signals, all as shown in waveform 412. The CPU 116 also activates ADS# to begin cycle 406. Cycle 406 is the same as cycle 402 except that, as mentioned above, WAITSEL=1. The various control and data signal transitions are substantially the same as in cycle 402, except that prior to time T12, the VGA controller 12 activates the WAIT# signal. In response, PLD 180 activates the internal LWAIT# signal at time T12, which delays the activation of RDYO# and everything which depends on RDYO#. Assuming the VGA controller 12 inserts only one wait state, it will deactivate WAIT# prior to time T13. PLD 180 therefore deactivates LWAIT# at time T13, and at time T14, activates the RDYO# signal. At time T15, since RDYO# is low, chipset 114 activates RDY# for the CPU 116 to indicate that the cycle will be complete at time T16. Also, although not shown in FIG. 4, the VGA controller 12 activates the DIR signal provided to buffers 144, 146, 148 and 150 during cycles 402 and 406 in order to specify the appropriate direction of data coupling from the VGA bus 130 to the local bus 110.

Memory write accesses to video memory proceed substantially the same as memory read accesses, the only major differences being that VMEMW# is generated rather than VMEMR#, valid write data is provided on the local bus CD lines at the beginning of the cycle instead of toward the end, and the write data reaches the VGA bus 130 DB lines as soon as ADRE# goes inactive and LRDMH2#/LRDML2# or LRDMH1#/LRDML1# goes active rather than toward the end of the cycle. Additionally, the DIR signal generated by VGA controller 12 is opposite.

Figure 5:
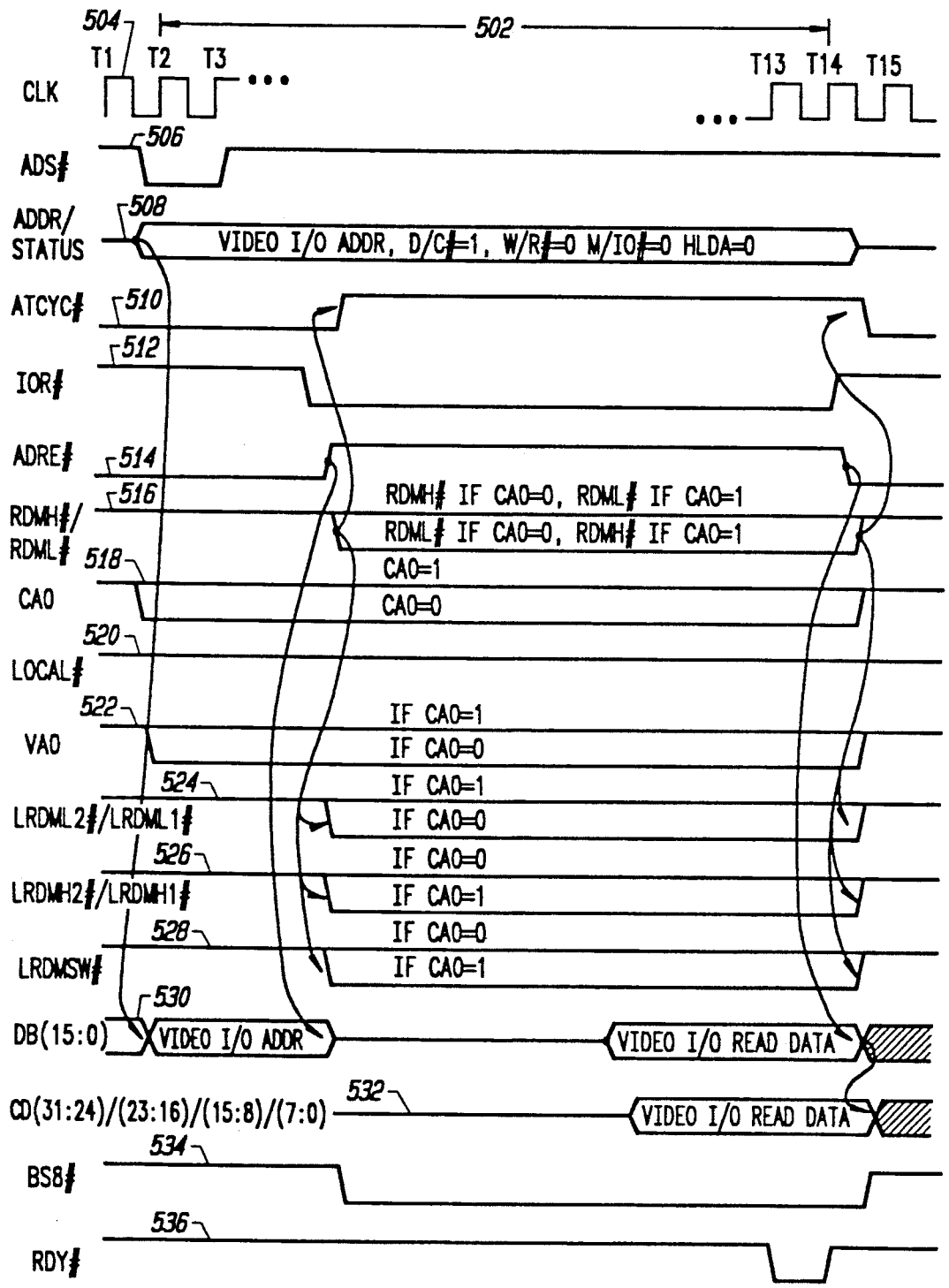
FIG. 5 is a timing diagram showing the operation of the apparatus of FIG. 2 for performing a read access to a video control register.

FIG. 5 shows a typical data read cycle from the I/O port of VGA controller 12. Such reads are typically 8-bit cycles, so an 8-bit read cycle 502 is shown.

In this timing diagram, the local bus clock signal is shown as waveform 504. Only portions of the CLK waveform representing the beginning and end of the cycle are shown in waveform 504, since all the intermediate timing depends on the I/O bus peripheral rather than the local bus clock. The ADS# signal from the CPU 116 is shown as waveform 506, and the address/status lines of the local bus 110 are shown as waveform 508. Waveform 510 shows the substitute ATCYC# output of PLD 174 (FIG. 10), and waveform 512 shows the I/O bus IOR# signal generated by chip set 114. Waveform 514 shows the ADRE# signal generated by VGA controller 12. Waveform 516 represents the RDMH#/RDML# signals generated by the VGA controller 12. If CA0=1, then the top line of this waveform represents the RDMH# signal and the bottom line represents the RDML# signal. If CA0=1, then the top line represents the RDML# signal and the bottom line represents the RDMH# signal.

Waveform 518 shows the I/O bus CA0 signal generated by the chipset 114 in response to the BE#(3:0) signals on the local bus 110. Waveform 520 shows the LOCAL# signal generated by PLD 172, and waveform 522 shows the VA0 signal generated by PLD 176. Waveforms 524, 526 and 528 show the LRDML2#/LRDML1# signal, the LRDMH2#/LRDMH1#signal, and the LRDMSW# signal, respectively, all generated by PLD 176. Waveform 524 represents the LRDML2# signal if the access is to an even byte in the high order 16 bits of a 32-bit word, and represents LRDML1# if the access is to an even byte in the low order 16 bits of a 32-bit word. Similarly, waveform 526 represents the LRDMH2# signal if the access is to an odd byte in the high order 16 bits of a 32-bit word, and represents LRDMH1# if the access is to an odd byte in the low order 16 bits of a 32-bit word. Each of the signals 524, 526 and 528 show their behavior separately for CA0=0 and CA0=1.

Waveform 530 shows the information which is present on the DB(15:0) lines of VGA bus 130, and waveform 532 shows the information which is present on the appropriate eight data lines of the local bus 110. Waveform 534 shows the BS8# signal generated by PLD 174 to indicate to the CPU 116 that the addressed I/O port can handle only 8-bit read accesses, and waveform 536 shows the RDY# signal generated by the chipset 114 to indicate completion of the cycle to the CPU 116.

As can be seen, prior to time T2, the CPU places valid address/status information on the local bus 110 as shown in waveform 508, and activates ADS# as shown in waveform 506. The chipset 114 generates the CA0 signal as shown in waveform 518 in response to the address/status information in waveform 508, and the PLD 176 in turn generates the VA0 signal as shown in waveform 522. Additionally, since ADRE# is active as shown in waveform 514, the video I/O address from the local bus 110 is also coupled to the DB(15:0) lines of VGA bus 130 via buffers 140 and 142 (FIG. 2) as shown in waveform 530. ADS# remains low until the rising edge of the next local bus clock cycle, that is, T3.

Some time later, the chipset 114 activates the I/O bus 112 IOR# signal to indicate that a read request is being made to a resource on the I/O bus. The VGA controller 12 recognizes this and deactivates ADRE# as shown in waveform 514 and activates the appropriate one of RDMH#/RDML# as shown in waveform 516. The PLD 176 then in turn activates the appropriate one of LRDML2#/LRDML1#/LRDMH2#/LRDMH1# as shown in waveforms 524 and 526, and if appropriate also activates LRDMSW# as shown in waveform 528. PLD 174 also removes the substitute ATCYC# signal (waveform 510) in response to activation of RDMH#/RDML#, and also activates the BS8# signal as shown in waveform 534. Removal of the substitute ATCYC# signal at this time prevents the chipset 114 from driving the data lines of local bus 110 with data which it expects to have received over the I/O bus 112.

Thereafter, the VGA controller 12 places the requested data from the I/O port onto the DB(15:0) lines of VGA bus 130 as shown in waveform 530, and this information is coupled directly onto local bus 110 via one of the buffers 144, 146, 148 or 150 as shown in waveform 532. Chipset 114 subsequently terminates the I/O read cycle by deactivating IOR# as shown in waveform 512. This causes VGA controller 12 to reactivate ADRE# as shown in waveform 514 and to deactivate RDMH#/RDML# as shown in waveform 516, which in turn makes the DB(15:0) lines of VGA bus 130 again available for address information as shown in waveform 530. It also causes PLD 174 to re-activate ATCYC#. Deactivation of RDMH#/RDML# also causes PLD 176 to deactivate LRDML2#/LRDML1#/LRDMH2#/LRDMH1# and LRDMSW# as shown in waveforms 524, 526 and 528, which in turn causes buffers 144, 146, 148 and 150 to stop driving video I/O read data onto the data lines of local bus 110 as shown in waveform 532. PLD 174 also deactivates BS8# at this time as shown in waveform 534. Chipset 114 also notifies the CPU 116 that the cycle is concluding by activating the RDY# line at time T13 and deactivating at time T14 as shown in waveform 536.

Figure 6:
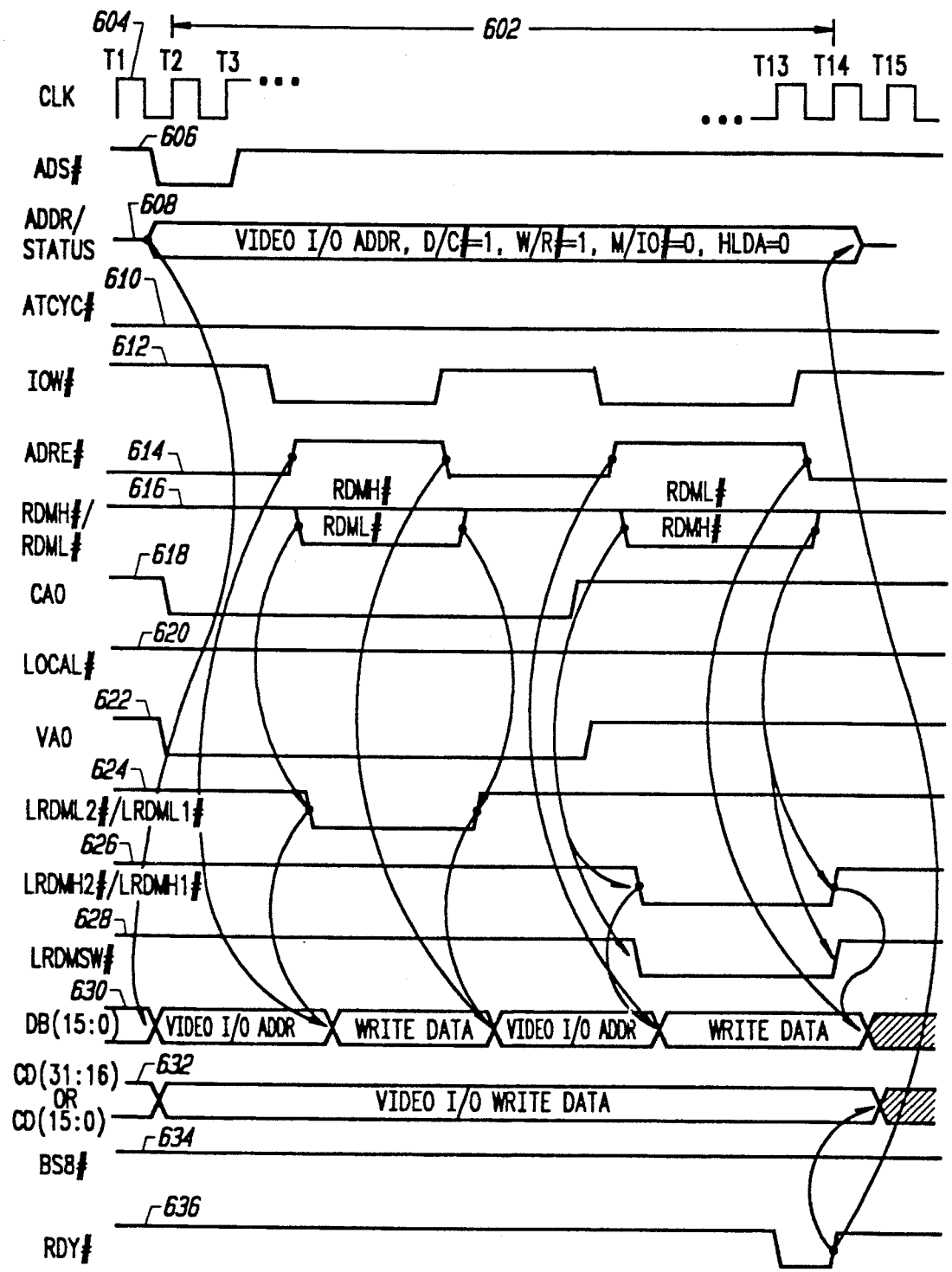
FIG. 6 is a timing diagram showing the operation of the apparatus of FIG. 2 for performing a write access to a video control register.

FIG. 6 shows a video I/O port write cycle. Since write accesses to the I/O port of the VGA controller 12 are usually 16-bit accesses, a 16-bit write cycle 602 is shown in FIG. 6. As in FIG. 5, FIG. 6 shows the local bus clock waveform 604, the ADS# signal 606, the address/status waveforms 608, and ATCYC# 610. Instead of IOR# signal 512, which remains high during the entire write cycle, FIG. 6 shows IOW# waveform 612. It also shows ADRE# waveform 64, RDMH#/RDML# waveform 616, CA0 waveform 618, LOCAL# waveform 620, VA0 waveform 622, LRDML2#/LRDML1# waveform 624, LRDMH2#/LRDMH1# waveform 626, LRDMSW# waveform 628, waveform 630 indicating the information on DB(15:0) of the VGA bus 130, waveform 632 indicating the information on the local bus data lines CD(31:16) or CD(15:0), whichever is appropriate, the BS8# waveform 634, and the RDY# waveform 636.

As with the read cycle 502, before the write cycle 602 begins, the CPU 116 places a valid video I/O address and control signals on the CA and status lines of local bus 110 as shown in wave form 608. The control signals include D/C#=1, W/R#=1, M/IO#=0, and HLDA=0. The video I/O address is coupled to the DB(15:0) lines of VGA bus 130 by buffers 140 and 142 (FIG. 2) as shown in waveform 630, since the ADRE# output of VGA controller 12 is low as shown in waveform 614. The CPU 116 also places the video I/O write data on local bus 110 data lines CD(31:16) or CD(15:0) as shown in waveform 632, depending on whether the write access is to the high order 16 bits of a 32-bit word, or the low order 16 bits of a 32-bit word, respectively. CPU 116 also activates the local bus ADS# signal (waveform 606) to indicate that valid information is now on the local bus. PLD 174 keeps the BS8# signal inactive (high) as shown in waveform 634 for the entire cycle 602. The chipset 114 accomplishes the write in two 8-bit I/O bus accesses, first writing the low order 8 bits and then the high order 8 bits.

Accordingly, as shown in waveform 618, the chipset 114 first outputs a low CA0 (waveform 618), and the PLD 176 responds by outputting a low VA0 (waveform 622). Thereafter, the chipset 114 begins the first I/O bus write cycle by activating IOW# line as shown in waveform 612. The VGA controller 12 responds by activating ADRE# (waveform 614) and RDML# (waveform 616). PLD 176 responds by activating LRDML2#/LRDML1# (waveform 624), whichever corresponds to the 16-bit portion of the 32-bit local bus data lines carrying the data, thereby causing either buffer 146 or buffer 150 to couple onto DB(7:0) the low-order 8 bits of the 16 data bits to be written (waveform 630). The video I/O address had previously been removed due to the deactivation of ADRE# (waveform 614). The ATCYC# signal remains active for the entire cycle 602 (waveform 610), and LOCAL# remains inactive for the entire cycle 602 (waveform 620).

After the write data settles on DB(7:0), chipset 114 deactivates IOW# (waveform 612). The VGA controller 12 then reactivates ADRE# (waveform 614) to return the video I/O address to DB(15:0), and also deactivates RDML# (waveform 616). PLD 176 responds to the deactivation of RDML# by deactivating LRDML2#/LRDML1# (waveform 624). As shown in waveform 618, the chipset 114 at this time also brings CA0 high in order to send the next byte of write data to the high order byte of the 16-bit VGA I/O port. PLD 176 also brings VA0 high at this time (waveform 622).

After the video I/O address settles on DB(15:0), the chipset 114 again activates IOW# (waveform 612). The VGA controller 12 deactivates ADRE# (waveform 614) and this time activates RDMH# instead of RDML# (waveform 616). The PLD 176 accordingly activates the appropriate one of LRDMH2#/LRDMH1# (waveform 626), instead of LRDML2#/LRDML1#, and also activates LRDMSW# (waveform 628) in order to copy DB(15:8) onto DB(7:0) via swap buffer 152. Deactivation of ADRE# and activation of LRDMH2#/LRDMH1# causes buffers 140 and 142 to remove the address from DB(15:0) and causes one of the buffers 144 or 148 to couple the write data onto DB(15:8) as shown in waveform 630.

Finally, after the write data has stabilized on DB(15:0), the chipset 114 deactivates IOW# (waveform 612), causing VGA controller 12 to reactivate ADRE# (waveform 614) and deactivate RDMH# (waveform 616). Deactivation of RDMH# causes PLD 176 to deactivate LRDMH2#/LRDMH1# (waveform 626) and LRDMSW# (waveform 628). Deactivation of LRDMH2#/LRDMH1# and reactivation of ADRE# then causes the buffers 140, 142, 144, 146, 148 and 150 to remove the write data from the VGA bus 130 and once again couple the low order 16 address bits from the local bus 110 onto VGA bus 130 (waveform 630).

As with read cycle 502, in anticipation of the end of the write cycle 602, chipset 114 activates the RDY#signal on the local bus 110 one local bus clock cycle prior to the completion of the access, and then returns RDY# to its inactive level on the next rising edge of the clock signal (waveform 636). The CPU 116 thereafter removes the video I/O address, control and write data signals from the local bus 110 (waveforms 608, 632).

Accordingly, it can be seen that for both the I/O read cycle 502 and the I/O write cycle 602, though all the normal I/O bus 112 control signals are generated by I/O interface chipset 114 (FIG. 2), the address and data information are coupled directly between the VGA bus 130 and the local bus 110 rather than between the VGA bus 130 and the I/O bus 112. It should be noted that although I/O chipset 114 may as a matter of course transmit address and data information from the local bus 110 onto the I/O bus 112 during this process, such information does not traverse the I/O bus 112 in order to reach the VGA controller 12. Only the control signals on I/O bus 112 are coupled to VGA controller 12.

Modularity Considerations

Figure 7:
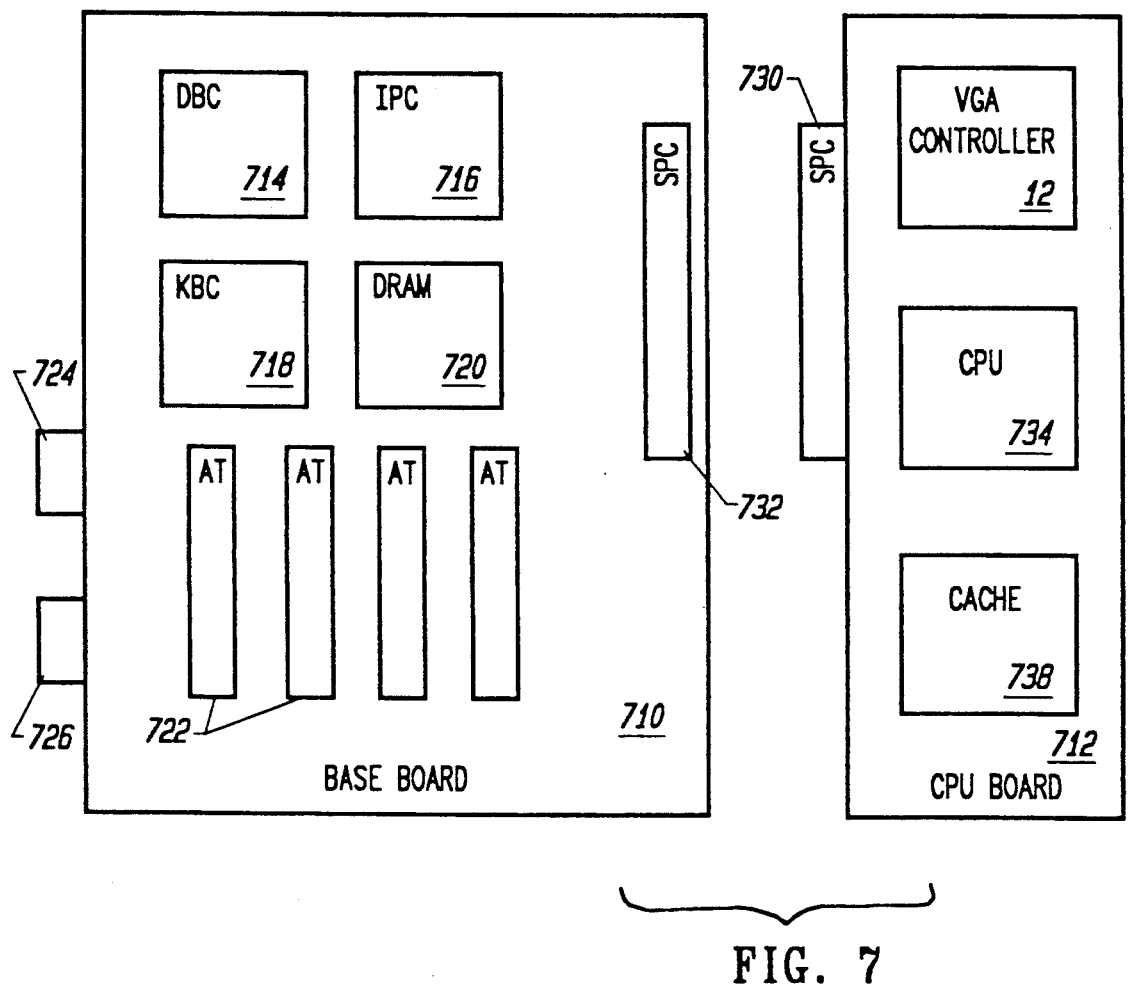
FIG. 7 is a board layout block diagram which may incorporate the invention.

Another advantage of the invention becomes apparent in embodiments which divide a traditional mother board into two or more boards to provide modularity of components. As shown in FIG. 7, the components on a traditional mother board can be divided into two separate boards, a base board 710 and a CPU board 712. Major components included on the base board 710 are the data bus controller (82C392) 714 (one of the chips in the I/O interface chipset 114 (FIG. 2)), an integrated peripheral controller 716 (e.g. 82C206), a keyboard controller 718, DRAM main memory 720, a plurality of AT bus connectors 722 for expansion slots, a keyboard connector 724 and a speaker connector 726.

Various CPU boards 712 are available for attaching to the base board 710 via respective special connectors 730 (on the CPU board 712) and 732 (on the base board 710). The CPU boards 712 can offer a variety of options, including either a 386DX or 486 CPU 734, an optional VGA controller 12, and an optional cache memory subsystem 738. The CPU board 712 also includes the system controller chip in the chipset (e.g. 82C491 or 82C493).

If the modular system of FIG. 7 implements an architecture which uses the VGA controller 12 conventionally, that is, coupled to the I/O bus only, then both the local bus and the I/O bus must be present on both boards. The local bus must be present on the CPU board since it must connect to the CPU 734, and it must be present on the base board 710 since it must connect at least to DRAM 720. The I/O bus must be present on the CPU board 712 since it is connected to the VGA controller 12, and must of course be present on the base board 710 at least for connection to the AT connectors 722. The same is true if the modular organization of FIG. 9 implements an architecture like that of FIG. 1.

If the modular design of FIG. 7 implements the architecture of FIG. 2, however, then the VGA controller 12 does not require the presence of the I/O bus data lines on the CPU board 712. These lines therefore need not be communicated from one board to the other via the special connectors 730 and 732, thereby significantly reducing the number of pins required in such connectors. This, too, is a significant benefit of the invention.

The invention has been described with respect to particular embodiments thereof, and it will be understood that numerous modifications are possible within the scope of the invention as set forth in the claims.

We claim:

1. Computer apparatus for use with a local device (116) having address (CA, BE#), data (CD) and control (M/IO#, W/R#, ADS#) lines, and having a local bus clock signal line carrying a local bus clock signal (CLK), said local device (116) being able to initiate a local device memory address space read access cycle to a first desired address in a memory address space by placing said first address on said address lines and issuing a first predefined combination of signals on said control lines in coordination with said local bus clock signal (CLK), said local device (116) also being able to initiate a local device I/O address space read access cycle to a second desired address in an I/O address space distinct from said memory address space, by placing said second address on said address lines and issuing a second predefined combination of signals on said control lines in coordination with said local bus clock signal (CLK), for use further with a peripheral subsystem (12) receiving control signals and having peripheral subsystem port leads (DC(15:0)) carrying data, said control signals received by said peripheral subsystem (12) including a peripheral subsystem memory address space read request signal (ADMR#) and a peripheral subsystem I/O address space read request signal (CIOR#), each of said peripheral subsystem read request signals (ADMR#, CIOR#) being received by said peripheral subsystem (12) in conjunction with a respective address received by said peripheral subsystem (12), said peripheral subsystem (12) outputting data over said peripheral subsystem port leads (DB(15:0)) in response to said peripheral subsystem memory address space read request signal (ADMR#) if the address received by said peripheral subsystem (12) in conjunction with said peripheral subsystem memory address space read request signal (ADMR#) is within a first predefined set of addresses (A0000-BFFFF) in said memory address space, and said peripheral subsystem (12) also outputting data over said peripheral subsystem port leads (DB(15:0)) in response to said peripheral subsystem I/O address space read request signal (CIOR#) if the address received by said peripheral subsystem (12) in conjunction with said peripheral subsystem I/O address space read request signal (CIOR#) is within a second predefined set of addresses (3B0-3DE) in said I/O address space, for use further with an I/O bus carrying data and control signals, said I/O bus carrying an I/O bus clock signal (BCLK) having a maximum frequency which is slower than that of said local bus clock signal (CLK), said I/O bus control signals including an I/O bus memory address space read request signal (MEMR#) which when asserted indicates a read access to an address in said memory address space, said I/O bus control signals further including an I/O bus I/O address space read request signal (IOR#) which when asserted indicates a read access to an address in said I/O address space, said apparatus comprising:

a first data path (114; 110) which only when enabled couples any of said data on said I/O bus to said data lines of said local device (116);

a second data path (144, 146, 148, 150; 110) which only when enabled couples said peripheral subsystem port leads (DB(15:0)) to said data lines of said local device (116);

bus interface control circuitry (114) which asserts said I/O bus memory address space read request signal (MEM#) synchronously with said I/O bus clock signal (BCLK) and enables said first data path (114; 110), both in response to a local device memory address space read access cycle initiated by said local device (116) to an address which is outside said first predefined set of addresses (A0000-BFFFF), said first data path (114; 110) not being enabled in response to a local device memory address space read access cycle initiated by said local device (116) to an address which is within said first predefined set of addresses (A0000-BFFFF), said bus interface control circuitry (114) further asserting said I/O bus I/O address space read request signal (IOR#) synchronously with said I/O bus clock signal (BCLK) and enabling said first data path (114; 110), both in response to a local device I/O address space read access cycle initiated by said local device (116) to an address which is outside said second predefined set of addresses (3B0-3DE), said first data path (114; 110) not being enabled in response to a local device I/O address space read access cycle initiated by said local device (116) to an address which is within said second predefined set of addresses (3B0-3DE); and peripheral subsystem control circuitry (170) which asserts said peripheral subsystem memory address space read request signal (ADMR#) synchronously with said local bus clock signal (CLK) and nonsynchronously with said I/O bus clock signal (BCLK) and which enables said second data path (144, 146, 148, 150; 110), both in response to a local device memory address space read access cycle initiated by said local device (116) to an address which is within said first predefined set of addresses (A0000-BFFFF), said second data path (144, 146, 148, 150; 110) not being enabled in response to a local device memory address space read access cycle initiated by said local device (116) to an address which is outside said first predefined set of addresses (A0000-BFFFF), said peripheral subsystem control circuitry (170) further enabling said second data path (144, 146, 148, 150; 110) in response to a local device I/O address space read access cycle initiated by said local device (116) to an address which is within said second predefined set of addresses (3B0-3DE), said second data path (144, 146, 148, 150; 110) not being enabled in response to a local device I/O address space read access cycle initiated by said local device (116) to an address which is outside said second predefined set of addresses (3B0-3DE).

2. Apparatus according to claim 1, wherein said bus interface control circuitry (114) asserts said I/O bus I/O address space read request signal (IOR#) synchronously with said I/O bus clock signal (BCLK) also in response to a local device I/O address space read access cycle initiated by said local device (116) to an address which is within said second predefined set of addresses (3B0-3DE).

3. Apparatus according to claim 1, wherein said apparatus lacks any data path coupling data on said peripheral subsystem port leads (DB(15:0)) to said I/O bus during the occurrence of any of said local device read access cycles initiated by said local device (116).

4. Apparatus according to claim 1, wherein said I/O bus further has address lines carrying addresses, further comprising:
a first address path (110; 114) which only when enabled coupled to any address on said address lines of said local device (116) to said address lines of said I/O bus; and
a second address path (110; 140, 142) which only when enabled coupled any address on said address lines of said local device (116) to said peripheral subsystem (12),
wherein said bus interface control circuitry (114) also enables said first address path (110; 114) in response to a local device memory address space read access cycle initiated by said local device (116) to an address which is outside said first predefined set of addresses (A0000-BFFFF), and also enables said first address path (110; 114) in response to a local device I/O address space read access cycle initiated by said local device (116) to an address which is outside said second predefined set of address (3B0-3DE), and wherein said peripheral subsystem control circuitry (170) also enables said second address path (110; 140, 142) during the occurrence of a local device memory address space read access cycle initiated by said local device (116) to an address which is within said first predefined set of addresses (A0000-BFFFF), and also enables said second address path (110; 140, 142) during the occurrence of a local device I/O address space read access cycle initiated by said local device (116) to an address which is within said second predefined set of addresses (3B0-3DE).

5. Apparatus according to claim 4, wherein said apparatus lacks any path coupling addresses from said address lines of said I/O bus to said peripheral subsystem (12) during the occurrence of any of said local device read access cycles initiated by said local device (116).

6. Apparatus according to claim 4, wherein said peripheral subsystem port leads (DB(15:0)) are multiplexed to carry said addresses received by said peripheral subsystem (12) as well as carrying said data outputted by said peripheral subsystem (12), said peripheral subsystem (12) further outputting multiplexing control signals (ADRE#; RDMH#, RDML#) and issuing a predetermined change in said multiplexing control signals (ADRE#, RDMH#, RDML#) after receiving one of said peripheral subsystem read request signals (ADMR#, CIOR#) and before outputting data in response to said one of said peripheral subsystem read request signals (ADMR#, CIOR#), said peripheral subsystem control circuitry (170) receiving said multiplexing control signals (ADRE#; RDMH#, RDML#), wherein said enabling of said second address path (110; 140, 142) during the occurrence of a local device read access cycle initiated by said local device (116) begins prior to said receipt by said peripheral subsystem control circuitry (170) of said predetermined change in said multiplexing control signals (ADRE#; RDMH ; RDML#) and terminates in response to said receipt by said peripheral subsystem control circuitry (170) of said predetermined change in said multiplexing control signals (ADRE#; RDMH#, RDML#), and wherein said enabling of said second data path (144, 146, 148, 150; 110) in response to said local device read access cycles initiated by said local device (116) occurs only after said receipt by said peripheral subsystem control circuitry (170) of said predetermined change in said multiplexing control signals (ADRE#; RDMH#, RDML#).

7. Apparatus according to claim 4, wherein said peripheral subsystem (12) further has high order address leads (DB(23:16)), said high order address leads (DB(23:16)) being connected to corresponding ones of said address lines (CA) of said local device (116).

8. Computer apparatus for use with a local device (116) having address (CA, BE#), data (CD) and control (M/IO#, W/R#, ADS#) lines, and having a local bus clock signal carrying a local bus clock signal (CLK), said local device (116) being able to initiate a local device memory address space write access cycle to a first desired address in a memory address space by placing said first address on said address lines and issuing a first predefined combination of signals on said control lines in coordination with said local bus clock signal (CLK), said local device (116) also being able to initiate a local device I/O address space write access cycle to a second desired address in an I/O address space distinct from said memory address space, by placing said second address on said address lines and issuing a second predefined combination of signals on said control lines in coordination with said local bus clock signal (CLK), for use further with a peripheral subsystem (12) receiving control signals and having peripheral subsystem port leads (DB(15:0)) carrying data, said control signals received by said peripheral subsystem (12) including a peripheral subsystem memory address space write request signal (CDMW#) and a peripheral subsystem I/O address space write request signal (MIOW#), each of said peripheral subsystem write request signals (CDMW#, MIOW#) being received by said peripheral subsystem (12) in conjunction with a respective address received by said peripheral subsystem (12), said peripheral subsystem (12) writing data from said peripheral subsystem port leads (DB(15:0)) in response to said peripheral subsystem memory address space write request signal (CDMW#) if the address received by said peripheral subsystem (12) in conjunction with said peripheral subsystem memory address space write request signal (CDMW#) is within a first predefined set of addresses (A0000-BFFFF) in said memory address space, and said peripheral subsystem (12) also writing data from said peripheral subsystem port leads (DB(15:0)) in response to said peripheral subsystem I/O address space write request signal (MIOW#) if the address received by said peripheral subsystem (12) in conjunction with said peripheral subsystem I/O address space write request signal (MIOW#) is within a second predefined set of addresses (3B0-3DE) in said I/O address space, for use further with an I/O bus carrying data and control signals, said I/O bus carrying an I/O bus clock signal (BCLK) having a maximum frequency which is slower than that of said local bus clock signal (CLK), said I/O bus control signals including an I/O bus memory address space write request signal (MEMW#) which when asserted indicates a write access to an address in said memory address space, said I/O bus control signals further including an I/O bus I/O address space write request signal (IOW#) which when asserted indicates a write access to an address in said I/O address space, said apparatus comprising:

a first data path (110; 114) which only when enabled couples any of said data on said data lines of said local device (116) to said I/O bus;

a second data path (110; 144, 146, 148, 150) which only when enabled couples said data lines of said local device (116) to said peripheral subsystem port leads (DB(15:0));

bus interface control circuitry (114) which asserts said I/O bus memory address space write request signal (MEMW#) synchronously with said I/O bus clock signal (BCLK) and enables said first data path (110; 114), both in response to a local device memory address space write access cycle initiated by said local device (116) to an address which is outside said first predefined set of addresses (A0000-BFFFF), said bus interface control circuitry (114) further asserting said I/O bus I/O address space write request signal (IOW#) synchronously with said I/O bus clock signal (BCLK) and enabling said first data path (110; 114), both in response to a local device I/O address space write access cycle initiated by said local device (116) to an address which is outside said second predefined set of addresses (3B0-3DE); and peripheral subsystem control circuitry (170) which asserts said peripheral subsystem memory address space write request signal (CDMW#) synchronously with said local bus clock signal (CLK) and nonsynchronously with said I/O bus clock signal (BCLK) and which enables said second data path (110; 144, 146, 148, 150), both in response to a local device memory address space write access cycle initiated by said local device (116) to an address which is within said first predefined set of addresses (A0000-BFFFF), said peripheral subsystem control circuitry (170) further enabling said second data path (110; 144, 146, 148, 150) in response to a local device I/O address space write access cycle initiated by said local device (116) to an address which is within said second predefined set of addresses (3B0-3DE).

9. Apparatus according to claim 8, wherein said bus interface control circuitry (114) both asserts said I/O bus I/O address space write request signal (IOW#) synchronously with said I/O bus clock signal (BCLK) and enables said first data path (110; 114), also in response to a local device I/O address space write access cycle initiated by said local device (116) to an address which is within said second predefined set of addresses (3B0-3DE).

10. Apparatus according to claim 8, wherein said apparatus lacks any data path coupling data on said I/O bus to said peripheral subsystem port leads (DB(15:0)) during the occurrence of any of said local device write access cycles initiated by said local device (116).

11. Apparatus according to claim 8, wherein said I/O bus further has address lines carrying addresses, further comprising:

a first address path (110; 114) which only when enabled couples any address on said address lines of said local device (116) to said address lines of said I/O bus; and a second address path (110; 140, 142) which only when enabled couples any address on said address lines of said local device (116) to said peripheral subsystem (12), wherein said bus interface control circuitry (114) also enables said first address path (110; 114) in response to a local device memory address space write access cycle initiated by said local device (116) to an address which is outside said first predefined set of addresses (A0000-BFFFF), and also enables said first address path (110; 114) in response to a local device I/O address space write access cycle initiated by said local device (116) to an address which is outside said second predefined set of addresses (3B0-3DE), and wherein said peripheral subsystem control circuitry (170) also enables said second address path (110; 140, 142) during the occurrence off a local device memory address space write access cycle initiated by said local device (116) to an address which is within said first predefined set of addresses (A0000-BFFFF), and also enables said second address path (110; 140, 142) during the occurrence of a local device I/O address space write access cycle initiated by said local device (116) to an address which is within said second predefined set of addresses (3B0-3DE).

12. Apparatus according to claim 11, wherein said apparatus lacks any path coupling addresses from said address lines of said I/O bus to said peripheral subsystem (12) during the occurrence of any of said local device write access cycles initiated by said local device (116).

13. Apparatus according to claim 11, wherein said peripheral subsystem port leads (DB(15:0)) are multiplexed to carry said addresses received by said peripheral subsystem (12) as well as carrying said data to be written by said peripheral subsystem (12), said peripheral subsystem (12) further outputting multiplexing control signals (ADRE#; RDMH#, RDML#) and issuing a predetermined change in said multiplexing control signals (ADRE#; RDMH#, RDML#) after receiving one of said peripheral subsystem write request signals (CDMW#, MIOW#) and before writing data in response to said one of said peripheral subsystem write request signals (CDMW#, MIOW#), said peripheral subsystem control circuitry (170) receiving said multiplexing control signals (ADRE#; RDMH#, RDML#),
wherein said enabling of said second address path (110; 140, 142) during the occurrence of a local device write access cycle initiated by said local device (116) begins prior to said receipt by said peripheral subsystem control circuitry (170) of said predetermined change in said multiplexing control signals (ADRE#; RDMH#, RDML#) and terminates in response to said receipt by said peripheral subsystem control circuitry (170) of said predetermined change in said multiplexing control signals (ADRE#; RDMH#, RDML#),
and wherein said enabling of said second data path (110; 144, 146, 148, 150) in response to said local device write access cycles initiated by said local device (116) occurs only after said receipt by said peripheral subsystem control circuitry (170) of said predetermined change in said multiplexing control signals (ADRE#; RDMH#, RDML#).

14. Apparatus according to claim 8, wherein said local device (116) is further able to initiate a local device memory address space read access cycle to a third desired address in said memory address space by placing said third address on said address lines and issuing a third predefined combination of signals on said control lines in coordination with said local bus clock signal (CLK), said local device (116) also being able to initiate a local device I/O address space read access cycle to a fourth desired address in said I/O address space, by placing said fourth address on said address lines and issuing a fourth predefined combination of signals on said control lines in coordination with said local bus clock signal (CLK),
wherein said control signals received by said peripheral subsystem (12) further includes a peripheral subsystem memory address space read request signal (ADMR#) and a peripheral subsystem I/O address space read request signal (CIOR#), each of said peripheral subsystem rad request signals (ADMR#, CIOR#) being received by said peripheral subsystem (12) in conjunction with a respective address received by said peripheral subsystem (12), said peripheral subsystem (12) outputting data over said peripheral subsystem port leads (DB(15:0)) in response to said peripheral subsystem memory address space read request signal (ADMR#) if the address received by said peripheral subsystem (12) in conjunction with said peripheral subsystem memory address space read request signal (ADMR#) is within said first predefined set of addresses (A0000-BFFFF) in said memory address space, and said peripheral subsystem (12) also outputting data over said peripheral subsystem port leads (DB(15:0)) in response to said peripheral subsystem I/O address space read request signal (CIOR#) if the address received by said peripheral subsystem (12) in conjunction with said peripheral subsystem I/O address space read request signal (CIOR#) is within said second predefined set of addresses (3B0-3DE) in said I/O address space,
wherein said I/O bus control signals further include an I/O bus memory address space read request signal (MEMR#) which when asserted indicates a read access to an address in said memory address space, said I/O bus control signals further including an I/O bus I/O address space read request signal (IOR#) which when asserted indicates a read access to an address in said I/O address space,
said apparatus further comprising:
a third data path (114; 110) which only when enabled couples any of said data on said I/O bus to said data lines of said local device (116); and
a fourth data path (144, 146, 148, 150; 110) which only when enabled couples said peripheral subsystem port leads (DB(15:0)) to said data lines of said local device (116),
wherein said bus interface control circuitry (114) further asserts said I/O bus memory address space read request signal (MEMR#) synchronously with said I/O bus clock signal (BCLK) and enables said third data path (114; 110), both in response to a local device memory address space read access cycle initiated by said local device (116) to an address which is outside said first predefined set of addresses (A0000-BFFFF), said third data path (114; 110) not being enabled in response to a local device memory address space read access cycle initiated by said local device (116) to an address which is within said first predefined set of addresses (A0000-BFFFF),
said bus interface control circuitry (114) further asserting said I/O bus I/O address space read request signal (IOR#) synchronously with said I/O bus clock signal (BCLK) and enabling said third data path (114; 110), both in response to a local device I/O address space read access cycle initiated by said local device (116) to an address which is outside said second predefined set of addresses (3B0-3DE), said third data path (114; 110) not being enabled in response to a local device I/O address space read access cycle initiated by said local device (116) to an address which is within said second predefined set of addresses (3B0-3DE),
and wherein said peripheral subsystem control circuitry (170) further asserts said peripheral subsystem memory address space read request signal (ADMR#) synchronously with said local bus clock signal (CLK) and nonsynchronously with said I/O bus clock signal (BCLK) and which enables said fourth data path (144, 146, 148, 150; 110), both in response to a local device memory address space read access cycle initiated by said local device (116) to an address which is within said first predefined set of addresses (A0000-BFFFF), said fourth data path (144, 146, 148, 150; 110) not being enabled in response to a local device memory address space read access cycle initiated by said local device (116) to an address which is outside said first predefined set of addresses (A0000-BFFFF), said peripheral subsystem control circuitry (170) further enabling said fourth data path (144, 146, 148, 150; 110) in response to a local device I/O address space read access cycle initiated by said local device (116) to an address which is within said second predefined set of addresses (3B0-3DE), said fourth data path (144, 146, 148, 150; 110) not being enabled in response to a local device I/O address space read access cycle initiated by said local device (116) to an address which is outside said second predefined set of addresses (3B0-3DE).

15. Apparatus according to claim 14, wherein said apparatus lacks any data path coupling data between said I/O bus and said peripheral subsystem port leads (DB(15:0)) during the occurrence of any of said local device access cycles initiated by said local device (116).

16. Apparatus according to claim 14, wherein said I/O bus further has address lines carrying addresses, further comprising:
a first address path (110; 114) which only when enabled couples any address on said address lines of said local device (116) to said address lines of said I/O bus; and
a second address path (110; 140, 142) which only when enabled couples any address on said address lines of said local device (116) to said peripheral subsystem (12),
wherein said bus interface control circuitry (114) also enables said first address path (110; 114) in response to a local device memory address space write access cycle initiated by said local device (116) to an address which is outside said first predefined set of addresses (A0000-BFFFF), and also enables said first address path (110; 114) in response to a local device I/O address space write access cycle initiated by said local device (116) to an address which is outside said second predefined set of addresses (3B0-3DE), and also enables said first address path (110; 114) in response to a local device memory address space read access cycle initiated by said local device (116) to an address which is outside said first predefined set of addresses (A0000-BFFFF), and also enables said first address path (110; 114) in response to a local device I/O address space read access cycle initiated by said local device (116) to an address which is outside said second predefined set of addresses (3B0-3DE), and wherein said peripheral subsystem control circuitry (170) also enables said second address path (110; 140, 142) during the occurrence of a local device memory address space write access cycle initiated by said local device (116) to an address which is within said first predefined set of addresses (A0000-BFFFF), and also enables said second address path (110; 140, 142) during the occurrence of a local device I/O address space write access cycle initiated by said local device (116) to an address which is within said second predefined set of addresses (3B0-3DE), and also enables said second address path (110; 140, 142) during the occurrence of a local device memory address space read access cycle initiated by said local device (116) to an address which is within said first predefined set of addresses (A0000-BFFFF), and also enables said second address path (110; 140, 142) during the occurrence of a local device I/O address space read access cycle initiated by said local device (116) to an address which is within said second predefined set of addresses (3B0-3DE).

17. Apparatus according to claim 16, wherein said apparatus lacks any path coupling addresses from said address lines of said I/O bus to said peripheral subsystem (12) during the occurrence of any of said local device access cycles initiated by said local device (116).

18. Apparatus according to claim 14, wherein said peripheral subsystem comprises a video controller and a video memory array, said video controller having video control registers accessible within a predefined video control register address range in said I/O address space,
wherein said first predefined set of addresses is included in the address range A0000h-BFFFFh,
and wherein said second predefined set of addresses is said predefined video control register address range.

19. Computer apparatus comprising:
a CPU subsystem (116, 110) having address leads (CA, BE#), data leads (CD) and control leads (M/IO#, ADS#);
an I/O subsystem (112, 120, 122, 154, 124, 126) having address leads (SA, LA, XA) and data leads (SD, XD);
a video controller (12) having address leads (A(19:16), DB(15:0)) and data leads (DB(15:0));
interface coupling circuitry (in 114) coupled to communicate data only when enabled, between said CPU subsystem data leads (CD) and at least some of said I/O subsystem data leads (SD, XD);
a data buffer (144, 146; 148, 150) connected directly between said CPU subsystem data leads (CD) and said video controller data leads (DB(15:0)), said data buffer communicating data between said CPU subsystem data leads (CD) and said video controller data leads (DB(15:0)) only when enabled; and
control means for enabling said interface coupling circuitry (114) in response to a first predefined combination of signals (M/IO#=M; ADS#=Active) on said CPU subsystem control leads only when said CPU subsystem address leads (CA, BE#) carry an address which is within a first predefined set of addresses,
and for enabling said data buffer (144, 146; 148, 150) in response to said first predefined combination of signals (M/IO#=M; ADS#=Active) on said CPU subsystem control leads only when said CPU subsystem address leads (CA, BE#) carry an address which is within a second predefined set of addresses distinct from said first predefined set of addresses.
said apparatus lacking any buffers connected directly between any of said I/O subsystem data leads (SD, XD) and said video controller data leads (DB(15:0)).

20. Apparatus according to claim 19, for use where CPU subsystem (116, 110) supports first and second distinct address spaces (memory address space; I/O address space), and wherein said control leads include an address space selection lead carrying an address space selection signal (M/IO#) indicating which of said distinct address spaces are referred to by an address on said CPU subsystem address leads (CA, BE#), wherein said first and second predefined sets of addresses are in said first address space and wherein said address space selection signal (M/IO#) in said first predefined combination of signals indicates said first address space and not said second address space.

21. Apparatus according to claim 20, wherein said control means is further for enabling said interface coupling circuitry in response to a second predefined combination of signals (M/IO# = IO; ADS# = Active) on said CPU subsystem control leads only when said CPU subsystem address leads (CA, BE#) carry an address which is within a third predefined set of addresses, an is further for enabling said data buffer (144, 146; 148, 150) in response to said second predefined combination of signals (M/IO# = IO; ADS# = Active) on said CPU subsystem control leads only when said CPU subsystem address leads (CA, BE#) carry an address which is within a fourth predefined set of addresses distinct from said third predefined set of addresses, wherein said third and fourth predefined sets of addresses are in said second address space and wherein said address space selection signal (M/IO#) in said predefined combination of signals indicates said second address space and not said first address space.

22. Apparatus according to claim 19, wherein at least a first subset (A(19:16)) of said address leads of said video controller (12) are connected to receive all signals which are carried by corresponding respective ones (CA(19:16)) of said address leads of said CPU subsystem (116, 110).

23. Apparatus according to claim 22, wherein a second subset (DB(15:2)) of said video controller address leads are multiplexed with said video controller data leads, said second subset being distinct from said first subset (A(19:16)), further comprising an address buffer (140, 142) connected between said second subset of video controller address leads (DB(15:2) and a corresponding subset (CA(15:2)) of said CPU subsystem address leads, said address buffer (140, 142) communicating address information from said subset (CA(15:2)) of said CPU subsystem address leads to said second subset of video controller address leads (DB(15:2)) only when enabled, said control means being further for enabling said address buffer whenever said CPU subsystem data leads (CD) are not in communication with said second subset of video controller address leads (DB(15:2)).

* * * * *

UNITED STATES PATENT AND TRADEMARK OFFICE
CERTIFICATE OF CORRECTION

PATENT NO. : 5,309,568

DATED : May 3, 1994

INVENTOR(S) : Subir Ghosh; Fong-Lu Lin

Page 1 of 2

It is certified that error appears in the above-identified patent and that said Letters Patent is hereby corrected as shown below:

| | |
|---|---|
| Col. 24, line 57, change "(MEM#)" to --(MEMR#)--. | June 19, 1993 Response, Claim 16, line 57. |
| Col. 25, line 58, change "coupled to" --coulpes--. | June 19, 1993 Response, Claim 19, line 5. |
| Col. 25, line 62, change "coupled to" --couples--. | June 19, 1993 Response, Claim 19, line 8. |
| Col. 26, line 33, change "ADRE#," to --ADRE#;--. | June 19, 1993 Response, Claim 21, line 9. |
| Col. 26, line 46, change "RDMH;" to --RDMH#,--. | June 19, 1993 Response, Claim 21, line 20. |
| Col. 26, line 66, change "signal carrying" to --signal line carrying--. | June 19, 1993 Response, Claim 23, line 4. |
| Col. 28, line 68, change "occurrence off" to --occurrence of--. | June 19, 1993 Response, Claim 26, line 21. |
| Col. 29, line 37, change "ADRE#," to --ADRE#;--. | June 19, 1993 Response, Claim 28, line 9. |
| Col. 29, line 68, change "rad" to --read--. | June 19, 1993 Response, Claim 29, line 17. |
| Col. 32, line 64, change "." to --,--. | June 19, 1993 Response, Claim 34, line 26. |
| Col. 33, line 22, change "an is" to --and is--. | June 19, 1993 Response, Claim 36, line 7. |
| Col. 34, line 2, change "said predefined" to --said second predefined--. | June 19, 1993 Response, Claim 36, line 15. |

UNITED STATES PATENT AND TRADEMARK OFFICE
CERTIFICATE OF CORRECTION

PATENT NO. : 5,309,568
DATED : May 3, 1994
INVENTOR(S) : Subir Ghosh, et al.

It is certified that error appears in the above-indentified patent and that said Letters Patent is hereby corrected as shown below:

Col. 34, line 18, change "(DB(15:2)   June 19, 1993 Response and" to --(DB(15:2)) and--.

Signed and Sealed this

Thirtieth Day of August, 1994

Attest:

Attesting Officer

BRUCE LEHMAN

Commissioner of Patents and Trademarks